(12) United States Patent
Bérard et al.

(10) Patent No.: US 10,217,265 B2
(45) Date of Patent: Feb. 26, 2019

(54) METHODS AND SYSTEMS OF GENERATING A PARAMETRIC EYE MODEL

(71) Applicant: Disney Enterprises, Inc., Burbank, CA (US)

(72) Inventors: Pascal Bérard, Zürich (CH); Thabo Beeler, Zürich (CH); Derek Bradley, Zürich (CH); Markus Gross, Zürich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 111 days.

(21) Appl. No.: 15/204,846

(22) Filed: Jul. 7, 2016

(65) Prior Publication Data

US 2018/0012401 A1   Jan. 11, 2018

(51) Int. Cl.
  *G06T 17/20* (2006.01)
  *G06T 19/00* (2011.01)
  *G06T 15/04* (2011.01)
  *G06T 19/20* (2011.01)

(52) U.S. Cl.
  CPC .............. *G06T 15/04* (2013.01); *G06T 19/20* (2013.01); *G06T 2219/2021* (2013.01)

(58) Field of Classification Search
  CPC .............................. G06T 17/20; G06T 19/00
  See application file for complete search history.

(56) References Cited

U.S. PATENT DOCUMENTS

| | | |
|---|---|---|
| 2005/0274314 A1 | 12/2005 | Norton et al. |
| 2007/0127844 A1 | 6/2007 | Watanabe |
| 2007/0140531 A1* | 6/2007 | Hamza ............... G06K 9/00597 382/117 |
| 2008/0088621 A1* | 4/2008 | Grimaud ................ G06T 19/00 345/421 |

(Continued)

OTHER PUBLICATIONS

U.S. Appl. No. 15/204,867, "Non-Final Office Action", dated Jan. 23, 2018, 15 pages.

(Continued)

*Primary Examiner* — Yi Yang
(74) *Attorney, Agent, or Firm* — Kilpatrick Townsend & Stockton LLP

(57) ABSTRACT

Systems and techniques for generating a parametric eye model of one or more eyes are provided. The systems and techniques may include obtaining eye data from an eye model database. The eye data includes eyeball data and iris data corresponding to a plurality of eyes. The systems and techniques may further include generating an eyeball model using the eyeball data. Generating the eyeball model includes establishing correspondences among the plurality of eyes. The systems and techniques may further include generating an iris model using the iris data. Generating the iris model includes sampling one or more patches of one or more of the plurality of eyes using an iris control map and merging the one or more patches into a synthesized texture. The systems and techniques may further include generating the parametric eye model that includes the eyeball model and the iris model.

21 Claims, 17 Drawing Sheets

(56) References Cited

U.S. PATENT DOCUMENTS

| | | | |
|---|---|---|---|
| 2010/0309350 A1* | 12/2010 | Adams, Jr. | H01L 27/14621 348/280 |
| 2013/0314411 A1 | 11/2013 | Turetzkey | |
| 2014/0016871 A1* | 1/2014 | Son | G06K 9/46 382/201 |
| 2014/0176565 A1* | 6/2014 | Adeyoola | G06T 19/006 345/473 |
| 2015/0029184 A1* | 1/2015 | Masumoto | G06T 19/00 345/419 |
| 2015/0139543 A1* | 5/2015 | Stewart | G06T 5/002 382/167 |
| 2015/0220768 A1 | 8/2015 | Ronnecke et al. | |
| 2018/0012418 A1 | 1/2018 | Berard et al. | |

OTHER PUBLICATIONS

Allen et al., "The space of human body shapes: reconstruction and parameterization from range scans", ACM Transactions on Graphics (TOG), vol. 22, ACM, 2003, 587-594.

Amberg et al., "Optimal step nonrigid icp algorithms for surface registration.", Computer Vision and Pattern Recognition, 2007. CVPR'07. IEEE Conference on, IEEE, 2007, 1-8.

Anguelov et al., "Scape: shape completion and animation of people.", ACM Transactions on Graphics (TOG), vol. 24, ACM, 2005, 408-416.

Ashikhmin, "Synthesizing Natural Textures", I3D '01, Proceedings of the 2001 symposium on Interactive 3D graphics, 2001, pp. 217-226.

Beeler, "High-quality passive facial performance capture using anchor frames.", ACM Trans. Graphics (Proc. SIGGRAPH) 30, 2011, 75:1-75:10.

Beeler et al., "High-quality single-shot capture of facial geometry", ACM Trans. Graphics (Proc. SIGGRAPH), 2010, 40:1-40:9.

Berard et al., "High-quality capture of eyes", ACM Trans. Graphics (Proc. SIGGRAPH Asia) 33, 2014, 223:1-223:12.

Blanz et al., "A morphable model for the synthesis of 3d faces.", Proc. of the 26th annual conference on Computer graphics and interactive techniques, 1999, 187-194.

Bradley et al., "High resolution passive facial performance capture.", ACM Trans. Graphics (Proc. SIGGRAPH) vol. 29 Article 41, 2010, 1-10.

Brown et al., "Non-rigid range scan alignment using thin-plate splines.", 3D Data Processing, Visualization and Transmission, 2004. 3DPVT 2004. Proceedings. 2nd International Symposium on, IEEE, 2004, 759-765.

Cao et al., "Displaced dynamic expression regression for real-time facial tracking and animation.", ACM Transactions on Graphics (TOG) 33, 2014, 43.

Cao et al., "Real-time high-fidelity facial performance capture.", ACM Trans. Graph. 34 (4), 2015, 46:1-46:9.

Chen, "Simple and efficient example-based texture synthesis using tiling and deformation.", Proceedings of the ACM SIGGRAPH Symposium on Interactive 3D Graphics and Games, ACM, 2013, 145-152.

Efros et al., "Image quilting for texture synthesis and transfer.", Proceedings of the 28th annual conference on Computer graphics and interactive techniques, ACM, 2001, 341-346.

Francois et al., "Image-based modeling of the human eye", IEEE TVCG 15, 2009, 815-827.

Funkhouser et al., "Modeling by example.", ACM Transactions on Graphics (TOG), vol. 23, ACM, 2004, 652-663.

Fyffe et al., "Comprehensive facial performance capture.", Eurographics, 2011.

Fyffe et al., "Driving high-resolution facial scans with video performance capture.", ACM Trans. Graphics 34, 1, 2014, 1-14.

Garrido et al., "Reconstructing detailed dynamic face geometry from monocular video.", ACM Trans. Graphics (Proc. SIGGRAPH Asia) 32, 2013, 158:1-158:10.

Ghosh et al., "Multiview face capture using polarized spherical gradient illumination", ACM Trans. Graphics (Proc. SIGGRAPH Asia) 30, 2011, 129:1-129:10.

Graham et al., "Measurement-Based Synthesis of Facial Microgeometry.", Comput. Graph. Forum ( ) 32, 2013, 35-344.

Haehnel et al., "An extension of the icp algorithm for modeling nonrigid objects with mobile robots", IJCAI, vol. 3, 2003, 915-920.

Hertzmann et al., "Image Analogies", SIGGRAPH '01 Proceedings of the 28th Annual Conference on Computer Graphics and Interactive Techniques, 2001, pp. 327-340.

Ikemoto et al., "A hierarchical method for aligning warped meshes.", 3-D Digital Imaging and Modeling, 2003. 3DIM 2003. Proceedings. Fourth International Conference on, IEEE, 2003, 434-441.

Jacob et al., "Design of steerable filters for feature detection using canny-like criteria.", Pattern Analysis and Machine Intelligence, IEEE Transactions on 26, 2004, 1007-1019.

Kazhdan et al., "Shape matching and anisotropy", ACM Transactions on Graphics (TOG), vol. 23, ACM, 2004, 623-629.

Kwatra et al., "Graphcut textures: image and video synthesis using graph cuts", ACM Transactions on Graphics (ToG), vol. 22, ACM, 2003, 277-286.

Lefohn et al., "An ocularist's approach to human iris synthesis", IEEE CG&A 23, 2003, 70-75.

Li et al., "Lightweight wrinkle synthesis for 3d facial modeling and animation", Computer-Aided Design 58, Jan. 2015, pp. 117-122.

Li, "Global correspondence optimization for non-rigid registration of depth scans.", Computer graphics forum, vol. 27, Wiley Online Library, 2008, 1421-1430.

Li et al., "Lightweight wrinkle synthesis for 3D facial modeling and animation", Computer-Aided Design 58 Jan. 2015, 117-122.

Liang et al., "Real-time texture synthesis by patch-based sampling", ACM Transactions on Graphics, vol. 20, No. 3, 2001.

Ma et al., "Rapid acquisition of specular and diffuse normal maps from polarized spherical gradient illumination", Proc. Rendering Techniques, 2007, 183-194.

MacKey et al., "Classification of iris colour: review and refinement of a classification schema.", Clinical & experimental ophthalmology 39, 2011, 462-471.

Mohammed et al., "Visiolization: generating novel facial images.", ACM Transactions on Graphics (TOG) 28 (3) 57, 2009.

Perez et al., "Poisson image editing", ACM Transactions on Graphics (TOG), vol. 22, ACM, 2003, 313-318.

Praun, "Lapped textures", Proceedings of the 27th annual conference on Computer graphics and interactive techniques, 2000, 465-470.

Ramanarayanan et al., "Constrained texture synthesis via energy minimization.", IEEE TVCG 13, 2007.

Rozenberg et al., "Chapter 4: The mathematical theory of L systems.", Springer, 1976.

Ruhland et al., "Look me in the eyes: A survey of eye and gaze animation for virtual agents and artificial systems", Eurographics State of the Art Reports, 2014, 69-91.

Sagar et al., "A virtual environment and model of the eye for surgical simulation", Proceedings of Computer Graphics and Interactive Techniques, 1994, 205-212.

Shen, "Simple and efficient method for specularity removal in an image", Optical Society of America, 2009, pp. 2711-2719.

Suwajanakorn et al., "Total moving face reconstruction", ECCV, 2014, 796-812.

Tai et al., "Super resolution using edge prior and single image detail synthesis.", CVPR., 2010.

Valgaerts et al., "Lightweight binocular facial performance capture under uncontrolled lighting.", ACM Trans. Graph. 31, 2012, 187.

Vlasic et al., "Face transfer with multilinear models", ACM Transactions on Graphics (TOG), vol. 24, ACM, 2005, 426-433.

Wei et al., "State of the Art in Example-based Texture Synthesis", Eurographics 2009, State of the Art Report, EG-STAR, Eurographics Association, 2009, 25 pages.

(56) References Cited

OTHER PUBLICATIONS

U.S. Appl. No. 15/204,867, "Final Office Action", dated Jul. 6, 2018, 16 pages.

U.S. Appl. No. 15/204,867, "Notice of Allowance", dated Sep. 14, 2018, 13 pages.

\* cited by examiner

METHODS AND SYSTEMS OF GENERATING A PARAMETRIC EYE MODEL

FIELD

The present disclosure generally relates to generating a parametric eye model. For example, one or more parts of an eye may be captured and reconstructed using the parametric model for use in rendering an animation of an eye.

BACKGROUND

Capturing faces using three-dimensional (3D) scanning techniques can be used to build face models for video games, visual effects in films, medical applications, personalized figurines, among other applications. Much research has allowed facial capture technology to achieve a high level of quality, to a point that it is oftentimes difficult to distinguish the difference between digital faces and real faces. Oftentimes, face capture research focuses on the facial skin, ignoring other important characteristics. One example is the eyes, which are an important part of the face. Techniques for producing digital doubles in computer graphics tend to give little attention to details of a subject's eye, with far less attention than capturing the rest of the face. Some efforts to focus on the eye include time consuming and uncomfortable capture set-ups for the actors.

SUMMARY

Techniques and systems are described for generating and using a parametric eye model for eye capture and reconstruction. The model is a deformable model that can be morphed to represent many or all possible shapes and colors that an eye can have. By being deformable, the model succinctly captures unique variations present across the different components of the eye. In some embodiments, the parametric eye model can be generated based on a training database of high-quality eye scans. The parametric eye model can include a deformable eyeball model representing the overall size and shape of the eyeball and cornea. The model can also include an iris model representing the detailed shape and color of the iris as well as the iris deformation under pupil dilation. In some examples, the model can include a vein model representing a detailed vein structure of the sclera, which contributes to the color and fine-scale surface details of the sclera.

In some examples, a fitting technique for reconstructing eyes from sparse input data (e.g., a single image, multi-view images from a single-shot multi-view face scanner, or other input data) using the parametric eye model is also provided. The parametric eye model provides a lightweight approach to eye capture that achieves high quality results from input data obtained using face scanners or from a single image. Using the fitting technique and the parametric eye model, new and unique human eyes can be reconstructed or created. Features, such as the shape, the color, or other features of the eyes, can be controlled without in-depth knowledge of the subtleties of real eyes. During fitting, the system finds the fitting parameters for the parametric eye model so that the model fits one or more input images as well as possible. For example, based on an input mesh of an eye from the input data, the fitting technique can estimate model parameters for the eyeball. The model parameters can drive the fitting of the parametric eye model to the input mesh. The model parameters can include a rigid transformation, a scale, coefficients of the deformable eyeball model, a radius and position of the pupil, or other suitable unknown parameters for the eyeball. The iris color texture and geometry, as well as the vein network, of the eye are also reconstructed using the iris model and the vein model of the eye model. Fitting using the parametric eye model produces plausible eye reconstructions with realistic details from a simple capture setup, which can be combined with a face scan to provide a more complete digital face model.

According to at least one example, a computer-implemented method of generating a parametric eye model of one or more eyes is provided that includes obtaining eye data from an eye model database. The eye data includes eyeball data and iris data corresponding to a plurality of eyes. The method further includes generating an eyeball model using the eyeball data. Generating the eyeball model includes establishing correspondences among the plurality of eyes. The method further includes generating an iris model using the iris data. Generating the iris model includes sampling one or more patches of one or more of the plurality of eyes using an iris control map and merging the one or more patches into a synthesized texture. The method further includes generating the parametric eye model that includes the eyeball model and the iris model.

In some embodiments, a system is provided for generating a parametric eye model of one or more eyes. The system includes a memory storing a plurality of instructions and one or more processors. The one or more processors are configurable to: obtain eye data from an eye model database, the eye data including eyeball data and iris data corresponding to a plurality of eyes; generate an eyeball model using the eyeball data, wherein generating the eyeball model includes establishing correspondences among the plurality of eyes; generate an iris model using the iris data, wherein generating the iris model includes sampling one or more patches of one or more of the plurality of eyes using an iris control map and merging the one or more patches into a synthesized texture; and generate the parametric eye model, the parametric eye model including the eyeball model and the iris model.

In some embodiments, a computer-readable memory storing a plurality of instructions executable by one or more processors may be provided. The plurality of instructions comprise: instructions that cause the one or more processors to obtain eye data from an eye model database, the eye data including eyeball data and iris data corresponding to a plurality of eyes; instructions that cause the one or more processors to generate an eyeball model using the eyeball data, wherein generating the eyeball model includes establishing correspondences among the plurality of eyes; instructions that cause the one or more processors to generate an iris model using the iris data, wherein generating the iris model includes sampling one or more patches of one or more of the plurality of eyes using an iris control map and merging the one or more patches into a synthesized texture; and instructions that cause the one or more processors to generate the parametric eye model, the parametric eye model including the eyeball model and the iris model.

In some embodiments, the method, system, and computer-readable memory described above may further include generating a vein model including a vein network. Veins in the network are grown from seed points in directions and by amounts controlled by one or more vein recipes. The parametric eye model includes the vein model.

In some embodiments, the eyeball model includes a principal component analysis (PCA) model or a morphable model (or other geometric model) built from the plurality of eyes in correspondence. In some examples, the eyeball model (e.g., PCA model, morphable model, or other model)

includes a mean shape of the plurality of eyes and a plurality of principal modes of variation, the plurality of principal modes of variation corresponding to variation among shapes of the plurality of the eyes. In some examples, establishing correspondences among the plurality of eyes includes: rigidly aligning each shape of each of the plurality of eyes with the eyeball model; fitting the eyeball model (e.g., the mean shape of the plurality of eyes) with a subset of the plurality of principle modes of variation of the eyeball model to each rigidly aligned shape of the plurality of eyes; non-rigidly deforming the fitted eyeball model to each shape of each of the plurality of eyes; and updating the eyeball model using all the non-rigidly deformed eyeball models.

In some embodiments, generating the iris model further includes: determining geometries for the iris model over a plurality of pupil dilations, wherein the geometries are indicated by vertex information of the one or more patches, wherein vertex information for a vertex of a patch includes a position of the vertex relative to one or more neighboring vertices; and synthesizing the geometries into the iris model.

In some embodiments, sampling the one or more patches using the iris control map includes: determining a plurality of saliency values for a plurality of patches of the iris control map, wherein the plurality of saliency values define an order in which the plurality of patches are synthesized into the iris model; and sampling the one or more patches according to the plurality of saliency values determined for the plurality of patches.

In some embodiments, the method, system, and computer-readable memory described above may further include combining high resolution frequencies of the synthesized texture with low resolution frequencies of the iris control map.

In some embodiments, the method, system, and computer-readable memory described above may further include obtaining an input image, and wherein reconstructing the one or more eyes using the parametric model includes determining parameters of the parametric eye model that match one or more eyes in the input image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Figure 1A:
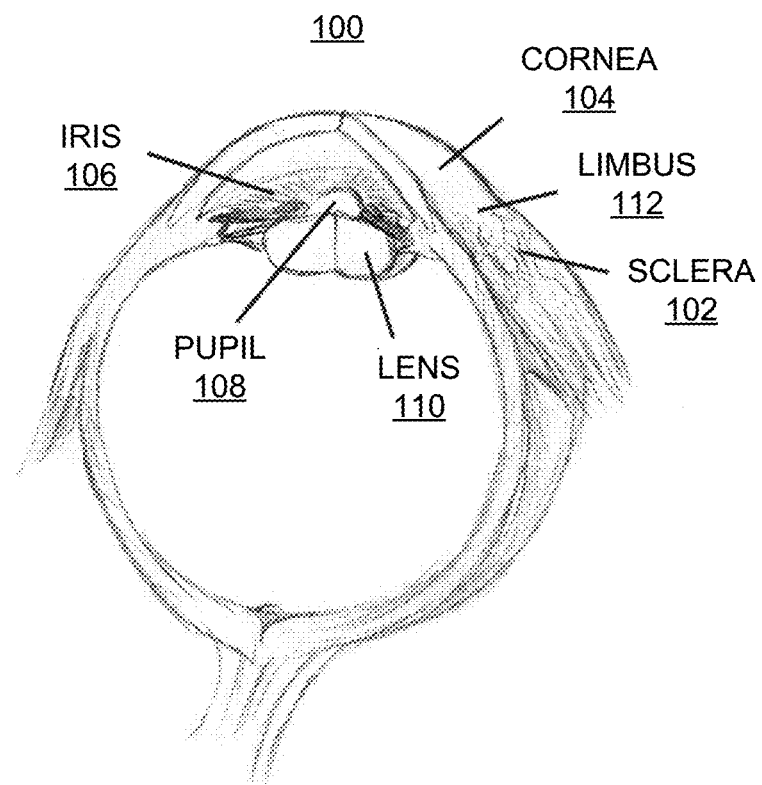
FIG. 1A illustrates a schematic of a human eye.
Figure 1B:
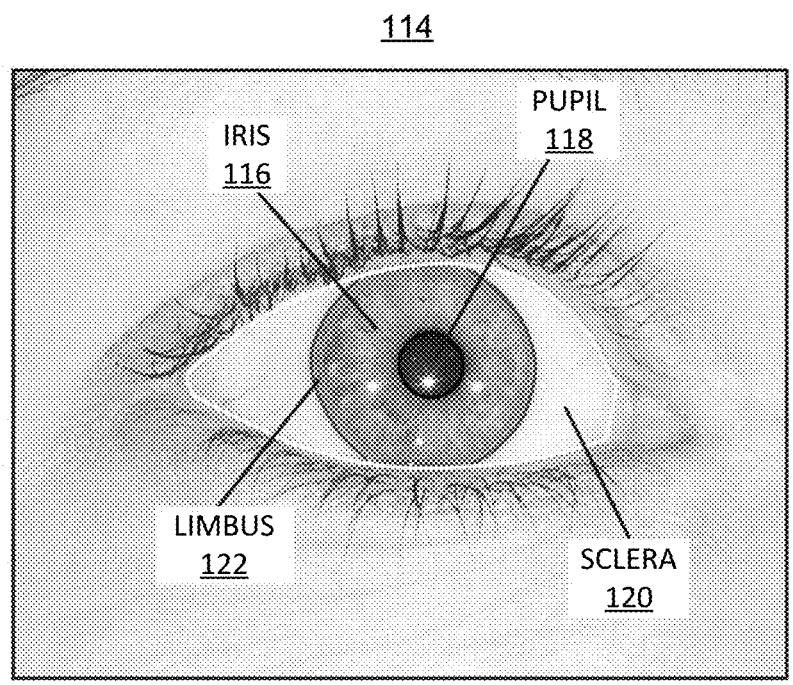
FIG. 1B illustrates a picture of a human eye.

Capturing faces using three-dimensional (3D) scanning techniques, or other similar scanning techniques, has become the industry-standard approach to build face models for visual effects in films, video games, medical applications, personalized figurines, among many other applications. Large amounts of research have allowed facial capture technology to reach a high level of quality, so much so that it may be difficult to distinguish between digital faces and real faces. Most research has focused on the facial skin, without regard to other important characteristics, including the eyes. In some instances, the eyes become an important part of the face. For example, many humans may focus on the eyes of a person or character when looking the person or character. In some instances, eyes can convey emotions and foretell the actions of a person. Even subtle inaccuracies in the eyes of a digital character can be the difference between a realistic animation and unnatural animation. FIG. 1A illustrates an example of a schematic of an eye 100 that includes a sclera 102, a cornea 104, an iris 106, a pupil 108, a lens 110, and a retina 112. FIG. 1B illustrates an image 114 of an eye that includes an iris 116, a pupil 118, a sclera 120, and the limbus 122. The limbus 122 demarcates the transition from the white sclera 120 to the transparent cornea (not shown in the image 114). The visible portion of the eye 100 is comprised of the sclera 102, the cornea 104, and the iris 106. Each of these visible portions includes unique features for different individuals. However, the individuality of the eye is not considered in common techniques for three-dimensional (3D) eye generation. While the eye is a central feature of individual appearance, its shape is sometimes approximated in computer graphics with gross simplifications.

Despite its importance, capturing the eyes has received far less attention than capturing the rest of the face. One technique focusing on the capture of eyes is described in Bérard, P., Bradley, D., Nitti, M., Beeler, T., and Gross, M. 2014. High-quality capture of eyes. ACM Trans. Graphics (*Proc. SIGGRAPH Asia*) 33, 6, 223:1-223:12, which is also described in U.S. application Ser. No. 14/550,751, filed Nov. 21, 2014, which is incorporated herein by reference in its entirety.

A lightweight approach to eye capture is provided herein that achieves a comparable level of quality as the results in Bérard, but from input data that can be obtained using traditional single-shot face scanning methods or even just from a single image. Techniques and systems are provided for generating a parametric model of the eye using a training database of high-quality scans including pre-capture eyes. The database of pre-captured eyes is leveraged to guide the reconstruction of new eyes from the much less constrained input data. The parametric eye model succinctly captures the unique variations present across the different components of the eye shown in FIG. 1A and FIG. 1B, including the overall size and shape of the eyeball and cornea 104, the detailed shape and color of the iris 106 and the deformation of the iris 106 under pupil 108 dilation, and the detailed vein structure of the sclera 102, which contributes to both its color and fine-scale surface details.

Using the parametric eye model, new and unique human eyes can be created. Aspects like the shape or the color can be controlled without in-depth knowledge of the subtleties of real eyes. Furthermore, a new fitting algorithm is provided herein for reconstructing eyes from sparse input data (e.g., multi-view images from a single-shot multi-view face scanner, or from a single image). The results of the fitting techniques include very plausible eye reconstructions with realistic details from a simple capture setup, which can be combined with a face scan to provide a more complete digital face model. Results are described below using a multi-view face scanner, but the fitting technique is flexible and can apply to any face capture setup. Furthermore, by reducing the complexity to a few intuitive parameters, the model can be fit to just single images of eyes or even artistic renditions, providing an invaluable tool for fast eye modeling or reconstruction from internet photos. The versatility of the eye model and fitting approach is also shown below by reconstructing several different eyes ranging in size, shape, iris color, and vein structure.

Figure 2:
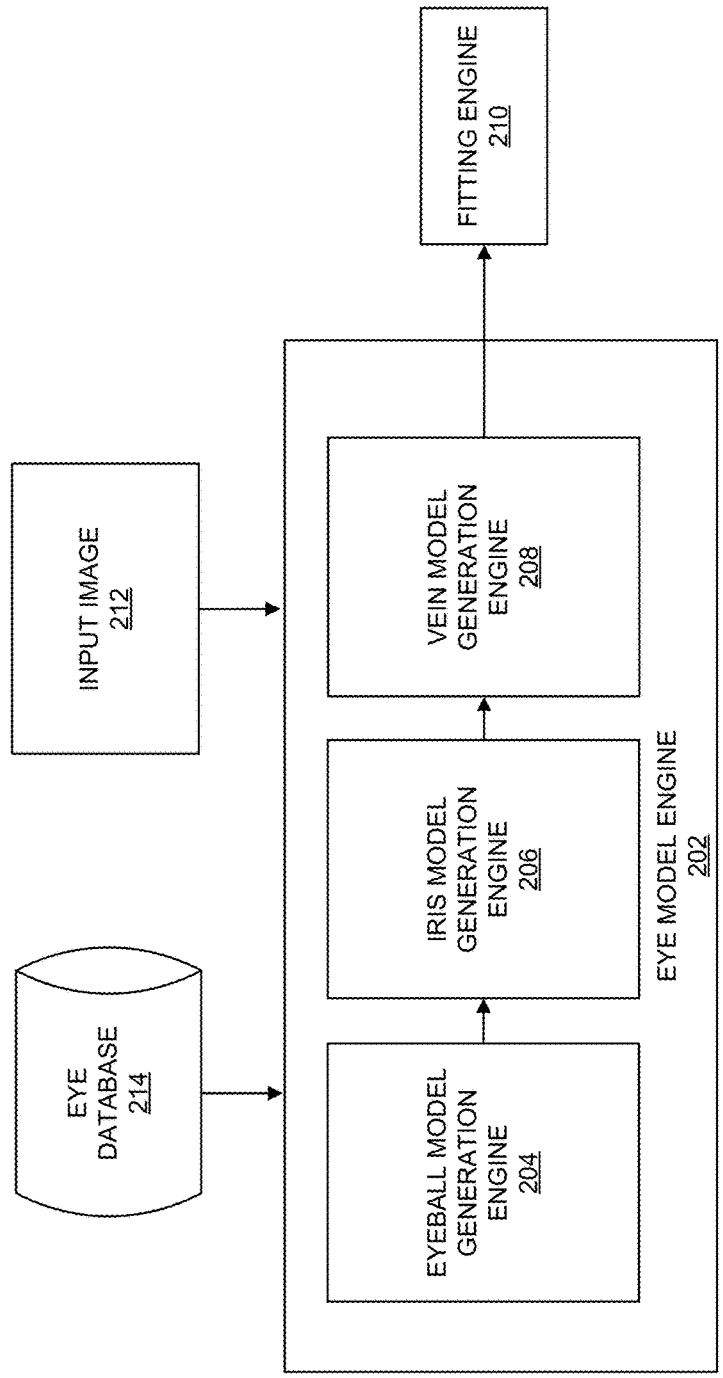
FIG. 2 illustrates an example of a system including an eye model engine and a fitting engine, in accordance with an embodiment of the application.

FIG. 2 illustrates an example of a system 200 including an eye model engine 202 and a fitting engine 210. The eye model engine 202 can generate a parametric eye model. For example, the eye model engine 202 can use an eye database 214 of high-resolution eye reconstructions to generate the various components of the parametric eye model. The fitting engine 210 can fit the parametric eye model with sparse image data. Further details on the fitting technique performed by the fitting engine 210 are described below.

Eyes are composed of several different components and contain many variations at multiple scales, making a single all-encompassing parametric model difficult to achieve. The parametric eye model described herein is built from three separate components, including an eyeball model built by the eyeball model generation engine 204, an iris model built by the iris model generation engine 206, and a sclera vein model built by the vein model generation engine 208. The various models represent different components of the eye. For example, the eyeball model represents the low-frequency variability of the entire eyeball shape. The iris model represents the high-resolution shape, color, and pupillary deformation of the iris. The sclera vein model represents the detailed vein structure in the sclera, including the vein network and the width and depth of individual veins, as well as fine-scale geometric surface details of the sclera.

Figure 3:
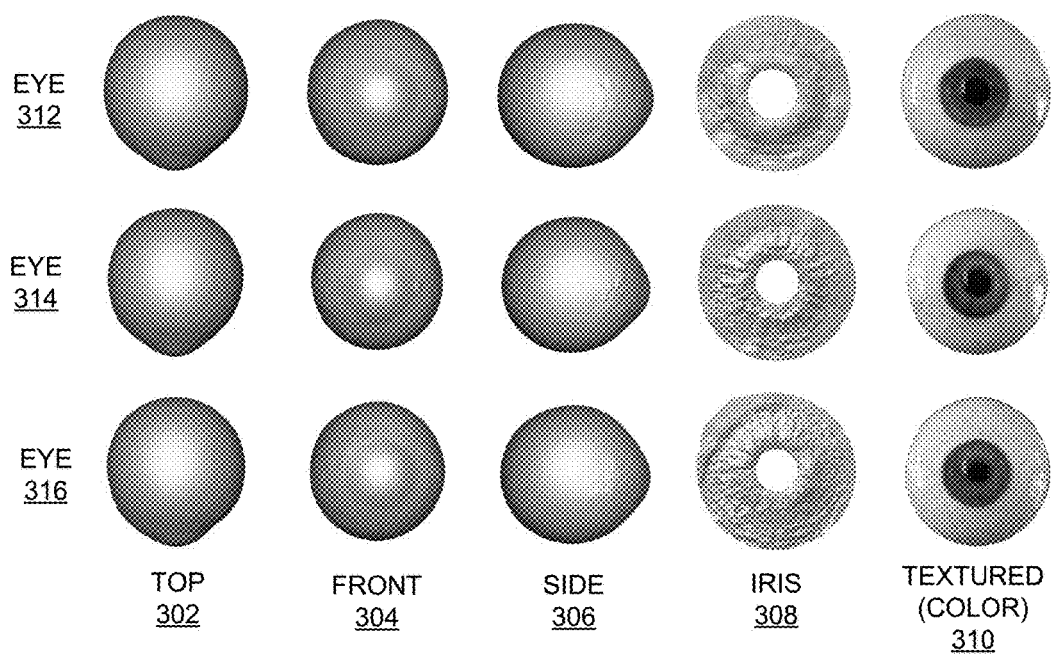
FIG. 3 illustrates an example of a subset of eyes in an eye database, in accordance with an embodiment of the application.

Input data used by the eye model engine 202 includes eye data from the eye database 214. The eye database includes eyeball data, iris data, and other suitable data relating to a set of eyes. For example, the eye database can include a set of high-quality eyes (e.g., a set of 15 eyes, 20 eyes, 25 eyes, 30 eyes, or other suitable number of eyes with varying characteristics). The eye database 214 provides high-resolution meshes and textures for the white sclera and the colored iris. In some examples, the iris geometry is provided as a deformation model, which the iris model generation engine 206 can use to create meshes for an entire range of pupil dilations. The meshes allow the iris model determining engine 206 to determine geometries for the iris model over many trajectories of iris deformation. The eye database 214 can contain eyes of different iris colors, ranging from brown to green-brown to blue. In some examples, a high resolution geometry in the eye database 214 can capture intricate eye-specific surface details. An example of a subset of the database eyes are shown in FIG. 3, including a top view 302, a front view 304, and a side view 306 of three different eyes 312, 314, and 316. The geometric structure of the iris of the three different eyes 312, 314, 316 in the database is shown in the iris column 308. The texture (or color) of the eyes 312, 314, 316 are shown in the texture (color) column 310. As can be seen in FIG. 3, the geometric structure of the iris in the iris column 308 is linked to its color in the texture (color) column 310. For example, browner irises are smoother while bluer irises are more fibrous.

In some examples, it can be assumed that right and left eyes are anti-symmetric. In such examples, the left eyes can be mirrored when building the model for the right eyes. In some examples, similarly, a mirrored version of the model can be used to represent the left eye. In some embodiments, the eye data in the eye database 214 can include a limbus opacity mask defining the transparency transition from the sclera to the cornea. The position of the limbus can be extracted from the limbus opacity mask by mapping a percent opacity level to the mesh (e.g., a 50 percent opacity level or other suitable opacity level).

The eyeball model generation engine 204 can use the data (e.g., eyeball data) from the eye database 214 to generate an eyeball model to represent an eyeball. The eyeball model can include a morphable model, which can be a good representation to capture low-frequency variation. A morphable model is a linear combination of a set of samples. An example of samples can include the shapes of the eyeballs in the eyeball database 214. In some embodiments, to avoid overfitting to the samples, the dimensionality can be reduced using methods such as principal component analysis (PCA). For example, PCA can be used to compute the mean shape plus a set of mutually orthogonal basis vectors from the samples, ordered according to their variance. Truncating the dimensions with lower variance leads to a subspace that captures the major variation in the samples and is resilient to noise. In addition to the shape variation, the eyeball model can also include a rigid transformation for the eyeball as well as a uniform scale factor.

In general, a morphable model requires all samples to be in correspondence. For example, the eyes in the eye database 214 need to be in correspondence so that a deformation model (the morphable eyeball model) between the different eyes can be generated. Being in correspondence means that corresponding points on the different eyeball shapes in the eye database 214 match between all of the eyeball pairs. Establishing correspondence within a set of shapes is a challenging and domain specific problem. For example, eyeballs exhibit only few semantic features that can be used to establish correspondence. An important feature is the limbus, which is the boundary between the white sclera and the transparent cornea (see FIG. 2). Other features of the eye (e.g., the overall asymmetry of the eye among other features) may be less salient than the limbus, but are encoded as well. These features, however, are not well defined and a two-step approach to build a morphable model by first establishing correspondences between all samples and then computing the model may not lead to satisfactory results. The two-step approach may be performed by the eyeball model generation engine 204 if a set of eyes are provided in correspondence.

Instead of a two-step approach to establish correspondence between the shapes, an iterative morphable model technique can be performed that alternates between establishing correspondences and computing the eyeball model. For example, the iterative morphable model technique can iteratively refine the model in three steps: first, by fitting the previous estimation of the model to the sample shapes (a "within-model fit" step); second, by non-rigidly deforming the prior fit outside of the model in order to more closely fit the eyeball samples from the eye database 214 (an "out-of-model fit" step); and third, by re-computing the model from the non-rigid fits (an update step). In some examples, the initial alignment of the first step at a first iteration can be used to compute an initial model that can include the mean shape of all the eyeballs in the eye database 214, and the second step at the first iteration can include taking each individual eyeball from the database 214 and aligning each eyeball with the mean shape. In the third step, the PCA mean shape and the set of mutually orthogonal basis vectors are updated. The first step can include a rigid alignment, and the second step can include a non-rigid deformation. The first step at subsequent iterations can include a rigid alignment with the updated PCA model shapes. This can be done for each eye in the database until a better alignment of the individual eyes with the mean model is achieved.

The first step is the within-model fit. In this step, the eyeball model M is fit to a sample shape S (a sample shape of an eyeball in the eye database 214) by finding the model parameters p that minimize the energy:

$$E_{model} = \lambda_{shape} E_{shape} + \lambda_{limbus} E_{limbus} + \lambda_{coeff} E_{coeff} \quad (1)$$

where the shape term $$E_{shape} = \frac{1}{|M|} \sum_{x_i \in M|_p} \|x_i - \chi(x_i, S)\|^2 \quad (2)$$

penalizes the distance between points $x_i$ on the model M evaluated at parameters p and their closest points $\chi(x_i, S)$ on the sample shape S, and where the limbus term $$E_{limbus} = \frac{1}{|L^M|} \sum_{y_i \in L^M|_p} \|y_i - \emptyset(y_i, L^S)\|^2 \quad (3)$$

penalizes the distance between points $y_i$ on the model limbus $L^M$ evaluated at parameters p and their closest points $\emptyset(y_i, L^S)$ on the limbus of the sample shape $L^S$. The shape coefficients term $$E_{coeff} = \frac{1}{k} \sum_{i=1}^{k} \left(\frac{c_i - \mu_i}{\sigma_i}\right)^2 \quad (4)$$

penalizes shape coefficients $c_i$ far away from the mean coefficients of the current model $M|_p$, where $\mu_i$ and $\sigma_i$ are the mean and the standard deviation of the i-th shape coefficient of the PCA model. The number of shape coefficients is k. In one illustrative example, the constants can be set to $\lambda_{shape}=1$, $\lambda_{limbus}=1$, and $\lambda_{coeff}=0.1$. However, one of ordinary skill in the art will appreciate that the constants can be set to any other suitable values.

The parameter vector p includes a rigid transformation, uniform scale, as well as an increasing number of shape coefficients, as discussed in the updating step below (the third step).

The second step is the out-of-model fit. The morphable model $M|_p$ fit from the within-model step will not match a sample S perfectly since it is constrained to lie within the model space, which has only limited degrees of freedom. In order to establish better correspondences for the next step, the eye model generation engine 204 further deforms the mesh non-rigidly to bring it out-of-model. A variant of a non-rigid deformation method designed for aligning a mesh to depth scans using a deformation graph and a continuous approximation of the target shape can be used. In particular, the eye model generation engine 204 is aligning the fitted model mesh to the database samples from the eye database 214. The non-rigid deformation is modified to operate in the spherical domain rather than the 2D depth map domain. Additional constraints are also added to match both the limbus boundary and the mesh normals during deformation. A single spherical coordinate parameterization manifests strong distortions at the poles. To reduce the distortion, two spherical coordinate parameterizations can be used, which are wrapped like the patches of a tennis ball. This way, the sweet spot of the first parameterization covers the distorted poles of the second parameterization. These parameterizations are combined so that the distortion in the domains is minimal. The energy that is minimized by the non-rigid deformation can be expressed as the sum of the following terms:

$$E_{nonrigid}=\lambda_r E_r + \lambda_s E_s + \lambda_f E_f + \lambda_n E_n + \lambda_l E_l \quad (5)$$

where $E_r$ is a rigid energy and $E_s$ is a shape energy. The $E_r$ term penalizes the deviation of each transformation from a pure rigid motion, and thus local features can deform as rigidly as possible avoiding shearing or stretching artifacts. For example, the term $E_r$ can be defined by:

$$E_r = \Sigma_i Rot(A_i), \text{ where} \quad (6)$$

$$Rot(A) = (a_1{}^t a_2)^2 + (a_1{}^t a_3)^2 + (a_2{}^t a_3)^2 + (1 - a_1{}^t a_1)^2 + (1 - a_2{}^t a_2)^2 + (1 - a_3{}^t a_3)^2 \quad (7)$$

The shape energy $E_s$ and the limbus energy $E_l$ correspond to the $E_{shape}$ and the $E_{limbus}$ energies of Equations 2 and 3, respectively, used in the within-model step. The normal energy $E_n$ is defined analogously to the shape energy $E_s$ as the euclidean difference between the normals of the model and the normals of the respective closest points on the sample shapes. In some examples, the constants can be set to $\lambda_{r,s}=0.01$ and $\lambda_{f,n,l}=1$. However, one of ordinary skill in the art will appreciate that the constants can be set to any other suitable values. The non-rigid deformation produces meshes {M}. The meshes {M} closely resemble the database samples {S}, but have the same topology as the eyeball model.

The third step is to update the eyeball model. From the non-rigidly aligned shapes {M}, an updated version of the model is computed using PCA and keeping only the mean shape plus the k most significant dimensions. In order to be robust towards initial misalignment, the algorithm can start with a very constrained model that includes the mean shape only (k=0), as noted above.

Figure 4:
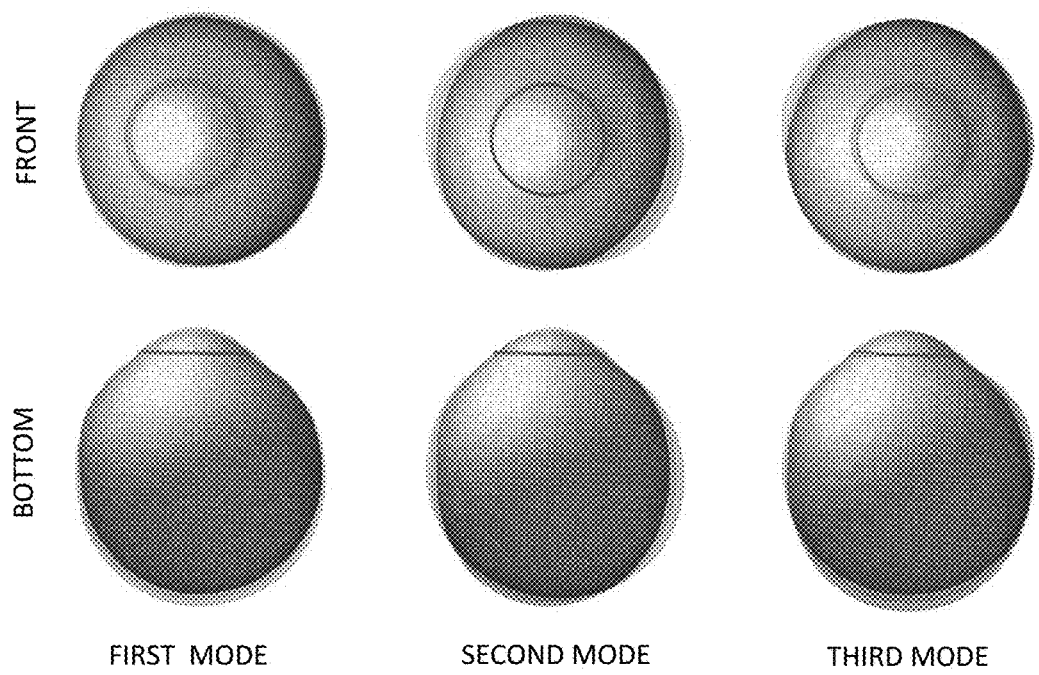
FIG. 4 illustrates an example of the deformation modes of an eyeball model, in accordance with an embodiment of the application.

The eyeball model generation engine 204 iterates these three steps. In some examples, the eyeball model generation engine 204 can iterate the three steps and can increase the dimensionality k of the model every 10 iterations by including the next most significant PCA vector. Increasing the dimensionality allows the model to better explain the data and, by doing so, can gradually provide robustness. In some examples, a fixed amount of iterations can be used because the error may not be comparable from one iteration to the other since the model is updated at the end of each iteration. In one illustrative example, after expanding the model three times (k=3), the first mode of the deformable model accounts for 92 percent of the variance, the first two modes account for 96 percent, and the first three modes account for 98 percent of the variation, which covers the low-frequency variation that is targeted with the eyeball model. In such an example, the final eyeball model contains 10 dimensions, six of which account for rigid transformation, one for uniform scale, and three for shape variation. FIG. 4 shows an example of the deformation modes of the eyeball model. For example, the figure visualizes the three modes of the eyeball prior, including a first mode, second mode, and third mode. For visualization purposes, the normalized dimensions, scaled by a factor of 50, are shown. As the eyeball does not contain much variation, three modes can be sufficient as shape prior in some instances.

The iris model generation engine 206 can use the data (e.g., iris data) from the eye database 214 and the input image 212 to generate an iris model to represent an iris of an eye. The iris model parameterizes the texture and geometry of an iris, given the database 214 of captured eyes. The iris is arguably the most salient component of the eye, and much of the individuality of an eye can be found in the iris. A large variety of irises exist in the human population, with dominant hues being brown, green, and blue. In addition to the hue, irises also vary greatly in the number and distribution of smaller features like spots, craters, banding, and other fibrous structures. Iris color and geometry are related, as the iris color is a direct function of the amount of melanin present in the iris, as shown in FIG. 3. For example, irises with little melanin have a blueish hue, and irises that contain more melanin become more brown. The accumulation of melanin changes the geometric structure of the iris, with blueish irises being more fibrous and brown irises being smoother overall, as shown by the iris column 308 in FIG. 3. The relationship between color and geometric structure is used in the iris model. The iris model provides a single parameterization that accounts for both color and geometric structure of the iris.

Figure 5:
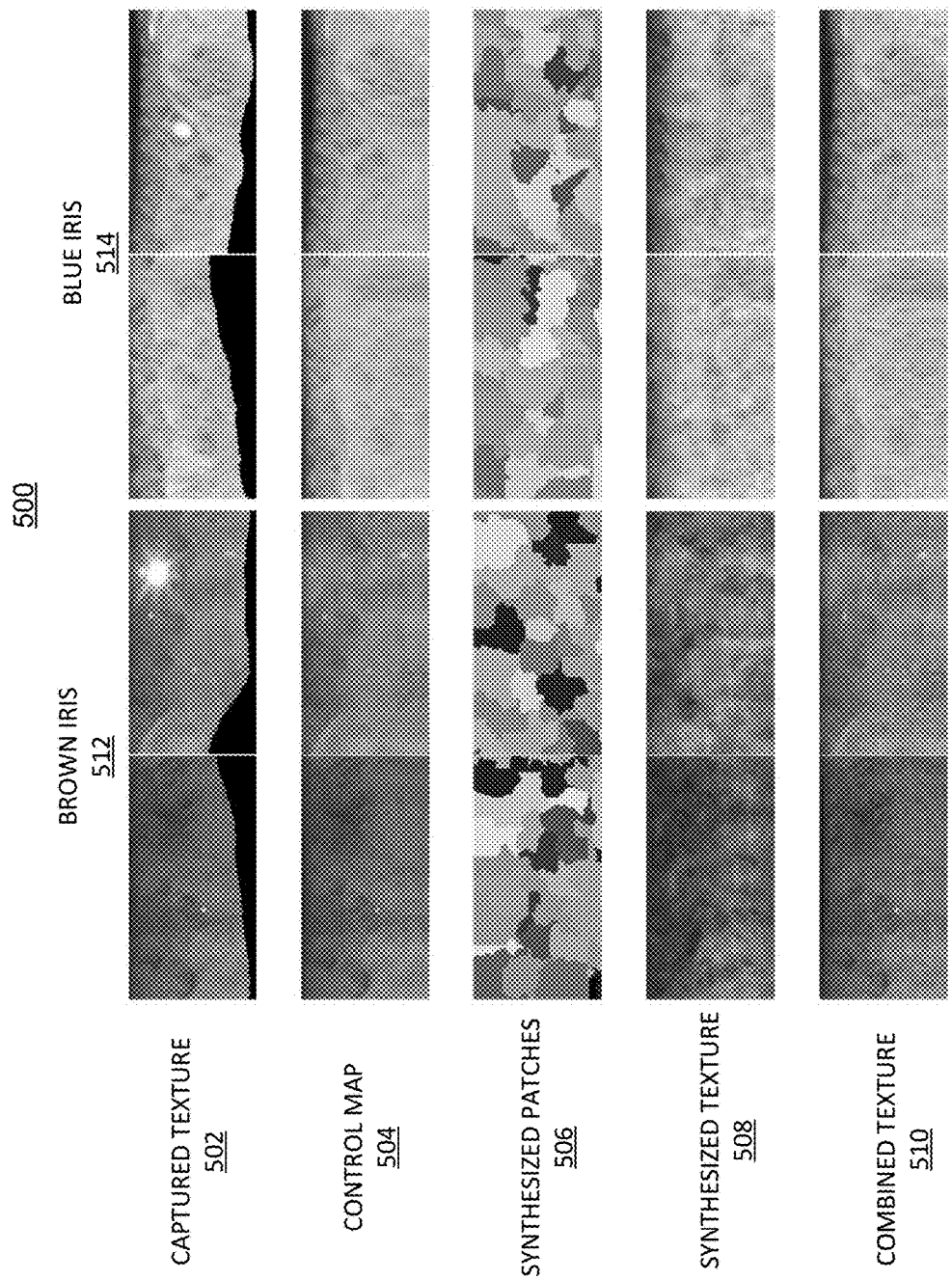
FIG. 5 illustrates the different stages of texture synthesis during iris model generation, in accordance with an embodiment of the application.

Since irises have such a wide range of variation, a Guassian-distributed PCA space, as used for the eyeball, may not be practical for parameterizing the irises. Instead, the variability is accounted for by parameterizing the iris using a control map. FIG. 5 shows an example of a control map 504. In some examples, the control map includes a low-resolution control map. The control map represents the spatially varying hue and the approximate distribution of finer-scale features. The control map guides the creation of a detailed high-resolution iris through constrained texture synthesis, using the irises in the eye database 504 as exemplars. In some embodiments, the control map can be extracted from the input image 212. The input image 212 can include a photograph, an artist rendering, or other suitable image that includes an iris. In one illustrative example, the control map can be extracted during the fitting step (described below) when reconstructing the eye of a specific person or character, in which case the input image 212 can include a face scan, a photograph, or other image. In another illustrative example, the control map can be sketched by an artist when creating fictional eyes. Based on the control map, a constrained synthesis algorithm can be used to generate a detailed color texture in high resolution (referred to as "iris texture synthesis"), and the synthesis can be extended to additionally create the geometric iris structure (referred to as "iris geometry synthesis").

The first step in iris model generation is to perform iris texture synthesis. Guided by the control map (e.g., a low-resolution control map), the iris model generation engine 206 can synthesize a high-resolution texture for the iris based on the eye database 214. The iris texture synthesis can include composing the high-resolution texture from exemplar patches from the eye database 214. The process can be guided by the control map. For example, the iris model generation engine 206 can select suitable patches from one or more eyes in the eye database 214, ensuring the selected patches conform both with the control map and the already synthesized parts of the texture. Using this approach, the control map and the already synthesized parts of the texture act as constraints on the patch selection. Once the patches have been selected, they are stitched together using graph cuts and combined to a seamless texture using a blending operation (e.g., Poisson blending or other suitable blending operation). The high-resolution texture can then be merged or combined with the initial control map (e.g., a low-resolution control map) in order to augment the low-resolution control map with high-resolution detail.

FIG. 5 shows the different stages of the texture synthesis, including the captured texture 502, the control map 504, the synthesized patches 506, the synthesized texture 508, and the combined texture 510. For example, as explained in more detail in the following paragraphs, synthesizing an iris includes capturing initial textures (e.g., captured texture 502), from which control maps (e.g., control map 504) are generated by removing specular highlights. The control map is input to a constrained texture synthesis that combines irregular patches (e.g., synthesized patches 506) from the eye database 214 to a single texture (e.g., synthesized texture 508), which is then filtered and recombined with the control map to augment the low-resolution control map with high-frequency detail (e.g., recombined to create combined texture 510). FIG. 5 shows close-ups from a brown iris 512 on the left and from a blue iris 514 on the right.

The iris texture synthesis can begin with the patch layout. The structure of an iris is arranged radially around the pupil. The texture synthesis operations can be performed in polar coordinates (angle/radius), which unwraps the radial structure (FIG. 5) and presents itself well for synthesis with rectangular patches. Textures have a certain resolutions can be synthesized with certain patch sizes (in pixels) that overlap by a certain number of pixels in both dimensions. In one illustrative example, the iris model generation engine 206 can synthesize textures of resolution 1024×256 pixels with patch sizes of 64×64 pixels that overlap each other by 31 pixels in both dimensions. One of ordinary skill in the art will appreciate that other resolutions, patch sizes, and overlapping amounts can be used without departing from the scope of the disclosure. While iris features may be distributed without angular dependency, the features do exhibit a radial dependency since the structure close to the pupil (pupillary zone) differs from the structure closer to the limbus (ciliary zone). To synthesize a specific patch in the output, the texture synthesis can consider sample patches at any angle with similar radii (e.g., radii within a range, such as ±5%, ±7.5%, ±10%, or other suitable range). One action that is performed due to using the polar coordinate representation is to ensure that the synthesized texture must can wrap smoothly in the angular dimension (across the left and right image boundaries), which is handled by the steps described below.

Output patch selection can then be performed. The iris is synthesized by iteratively placing patches from the database iris textures from the eye database 214. In each iteration, the iris model generation engine 206 first determines where to synthesize the next patch in the output texture. In some examples, a sequential order can be used (e.g., from left to right or top to bottom). As noted above, the control map and the already synthesized parts of the output texture act as constraints on the patch selection. Using a sequential order can sometimes lead to unsatisfactory results since important features, such as spots or freckles, can be missed because neighboring patches in the output may provide a stronger constraint than the control map.

In some examples, patch selection can be based on saliency. Saliency indicates how much a feature or object stands out relative to neighboring features or objects. A saliency-based approach for the iris is advantageous because the iris can have salient details (e.g., spots, an interesting structure or color, or other salient feature) that are noticeable by a viewer. Selecting patches based on saliency ensures that the salient parts of the iris are synthesized first in order to get the closest representation of the iris. Using a saliency-based technique, a next patch can be selected based on control map saliency, which synthesizes patches in visually important areas first (based on saliency), thus allowing the patches to be more faithful to the control map and spreading the control map residual error into less salient areas. For example, each pixel can be assigned a saliency value, and the most salient patches (based on saliency values for pixels in the patch) can be selected earlier for synthesis than less salient patches. In some cases, the iris model generation engine 206 can sequentially select patches based on the saliency values, starting with the highest value and going down the list of patches in descending order of saliency values. Using a saliency-based approach allows the output texture to be less of a constraint on the more salient patches and the patches to be more faithful to the control map. The output texture is less of a constraint because less patches are present in the output texture (and thus less constraints are present) when the more salient features are being synthesized into the output texture earlier in the synthesis process (due to having higher saliency values). In some examples, saliency for the patches can be computed using steerable filters. For example, steerable filters can be used to compute a magnitude of edges and ridges of the patches, which are used as a saliency metric.

The iris model generation engine 206 can then perform exemplar selection to select exemplar patches from the eye database 214 that match the patches selected during patch selection. For example, once the location for the next patch to be synthesized has been determined during patch selection, a suitable patch exemplar is retrieved from the eye database 214. Similar to the patch selection above, the control map and the already synthesized parts of the output texture act as constraints, and thus the retrieved exemplar should be faithful to both the control map and any neighboring patches that have already been chosen. Similarity to the control map, denoted $e_c$, is computed as the mean squared error between a downscaled version of the exemplar and the patch of the control map. To gain invariance over differences in exposure and because an important quantity at this stage is faithful color reproduction, the error is computed over the red-gree-blue (RGB) channels, but the mean intensity of the exemplar is scaled globally to match the mean intensity of the control patch. Similarity to the already synthesized texture, denoted $e_n$, is computed as mean squared error over the overlapping pixels. The two similarity measures are linearly combined into a single quantity:

$$e = \alpha e_n + (1-\alpha) e_c, \quad (8)$$

where we use $\alpha=0.25$ for all examples in this paper. The exemplar patch with the smallest error is chosen, as it is the patch the best meets the control map and synthesized texture constraints.

Patch merging can be performed to merge the patches together. For example, the end result of the above steps (patch layout, output patch selection, and exemplar selection) is a set of overlapping patches that cover the entire iris texture. While the patches are carefully selected, they will still exhibit seams. Techniques can be used to minimize the visibility of the seams by reducing the seams. In one example, a graph cut can be used to find seams between patches that better respect the underlying image structure. For example, a seam can be found that minimizes a color difference across a cut. For each patch, pixels at the boundary of the patch that overlap neighboring patches are labeled as sinks and the pixel at the center of the patch are labeled as a source. A graph for the current patch is constructed with horizontal and vertical edges. The capacity of each edge is set to be the difference of the two connected pixels. A max-flow/min-cut algorithm can be used to solve for the cut.

Patch blending can be performed to remove the seams. For example, once merged, the texture has a unique color per pixel with minimal, yet still visible, seams between patches. To completely remove the seams, the iris model generation engine 206 can apply a blending technique, such as Poisson blending. For example, using Poisson blending, the iris model generation engine 206 can set the desired color gradients across patch seams to be zero while preserving color detail within patches.

In examples in which the control map is from a low-resolution image, the iris model generation engine 206 can perform texture blending to blend the synthesized texture with the control map. By definition, the synthesized texture T should match the control map C and contains more high frequency detail. However, the control map itself already contains a lot of structural information that is beneficial to preserve. For example, the control map includes the iris of the subject to be synthesized, and thus looks most like the eye that is to be reconstructed. Therefore, it is advantageous to blend the synthesized texture with the control map. The blending can add the high resolution part (the high frequency part) of the synthesized texture to the lower frequency image of the control map, resulting in the original representation of the eye in the control map being kept but enhanced with the high resolution synthesized details that are not visible in the lower frequency image. In examples in which a high-resolution control map is used, the iris model generation engine 206 can synthesize the texture of the control map without performing texture blending to add additional detail to the control map.

The texture blending is performed so that it does not superimpose the same frequencies from the synthesized texture and the control map. For example, assuming the captured image (from which the control map is generated) is in focus, the frequency content of the control map is determined by the resolution at which it was acquired. If the synthesis is based on a control map including a low-resolution image that captures the complete face, then the iris model generation engine 206 can add a larger range of spatial frequencies than if the original input image was focused onto the eye and hence of high resolution. To avoid superimposing the same frequency bands, the synthesized texture can be bandpass filtered before blending with the control map. The bandpass filter can be modeled as a Gaussian $\mathcal{G}$ with the standard deviation computed from the ratio in width of the synthesized texture $T_{width}$ and the control map $C_{width}$ as:

$$\sigma = \frac{T_{width}}{C_{width}} \sigma', \qquad (9)$$

where $\sigma'$ is the standard deviation of the Gaussian at the resolution of the control map, which can be set to any suitable value (e.g., set to 1 px or other suitable value). In some cases, a larger $\sigma'$ can be chosen to account for noise or defocus of the control map. The high-pass filtered texture and low-pass filtered control map are then combined as:

$$T \leftarrow (T - \mathcal{G} * T) + \mathcal{G} * C, \qquad (10)$$

and then re-converted from polar coordinates to create the final texture of the iris.

After iris texture synthesis, the next step in iris model generation is to perform iris geometry synthesis. As mentioned above, there is an inherent coupling between iris texture and geometric structure. This coupling can be exploited to synthesize geometric details alongside the iris texture. The eye database 214 contains both high-resolution iris textures and iris deformation models, which encode iris geometry as a function of the pupil dilation. Since the iris structure changes substantially under deformation (due to pupil dilation), the geometry can be synthesized at the observed pupil dilation. In addition, the algorithm can also provide extrapolations to other pupil dilations, allowing control of the iris virtually after reconstructing the eye.

The geometry is represented in the eye database 214. The iris geometries in the database can be encoded in cylindrical coordinates (angle/radius/height), which renders them compatible to the domain used for texture synthesis. Spatially, the iris deformation model can be discretized such that the deformation model has one vertex per pixel of the corresponding texture, with full connectivity to its eight neighbors. Temporally, the deformation model can be discretized at four different pupil dilations, spaced equally to span the maximum dilation range common to all exemplars. One of the pupil dilations can be picked to match the dilation of the eye to synthesize.

Figure 6:
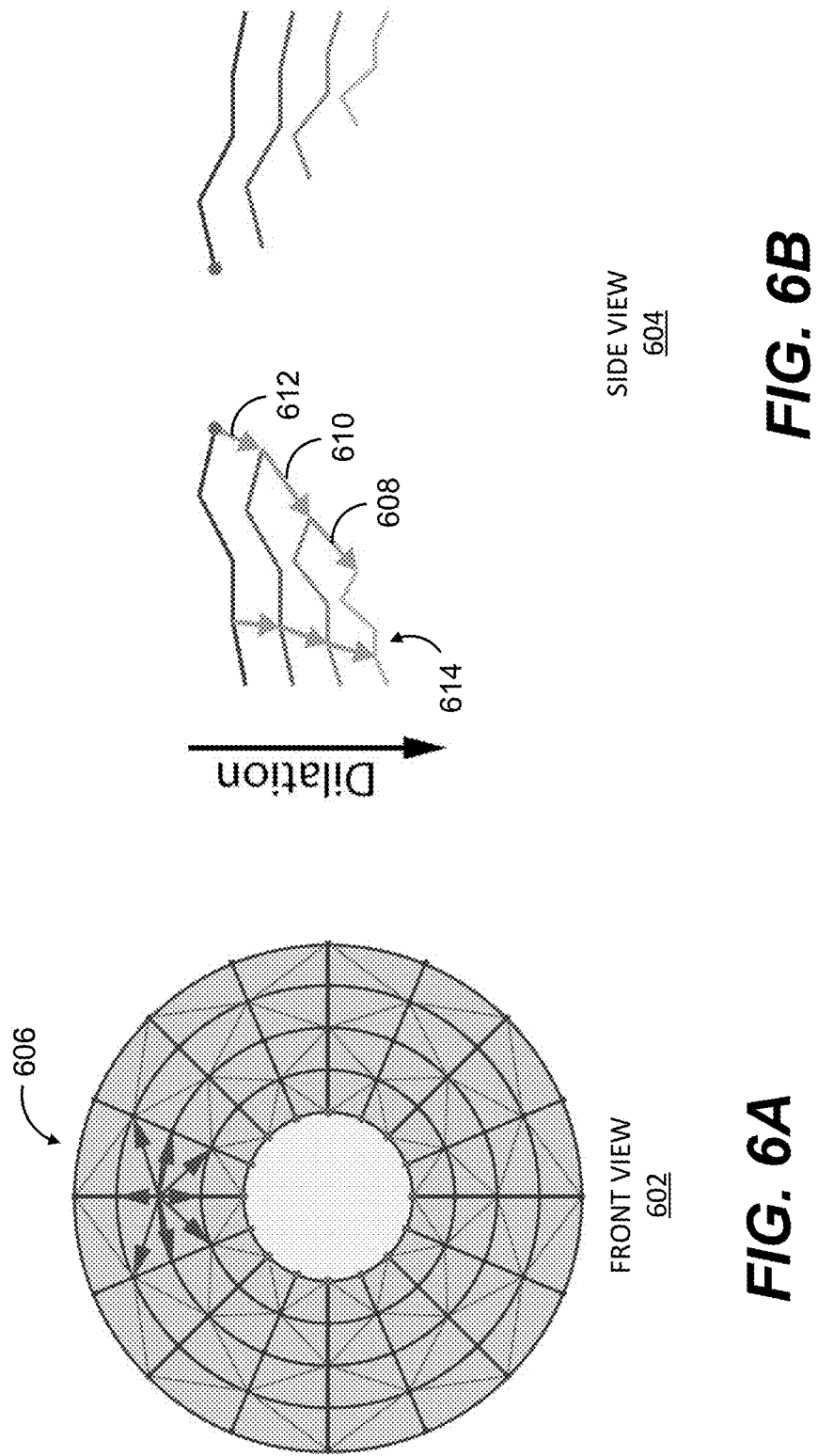
FIG. 6A illustrates an example of a front view of an iris showing vertices of the iris, in accordance with an embodiment of the application.
FIG. 6B illustrates an example of a side view of the iris showing pupil dilations, in accordance with an embodiment of the application.

Synthesizing geometry cannot be performed using absolute spatial coordinates since patches are physically copied from one spatial location in the exemplar to another in the output texture. For this reason, the geometry of the iris can be encoded using differential coordinates that encode the difference in angle, radius, and height between a vertex on the iris mesh and neighboring vertices. The synthesized geometry can then be recovered using Poisson reconstruction. FIG. 6A illustrates a front view 602 of a schematic representing an iris and a pupil. FIG. 6B illustrates a side view 604 showing various pupil dilations. The iris geometry can be tesselated uniformly in the polar domain, yielding eight neighbors per vertex spatially (vectors 606) as well as the forward neighbors in time (e.g., vectors 608, 610, 612), which describe the trajectory a vertex follows during dilation. The front view 602 shows vertices on an iris and vectors 606 associated with one vertex pointing to neighboring vertices. For example, for every vertex, the iris geometry is encoded by the eight differential vectors (e.g., the vectors 606) to spatial neighbors of each vertex, plus three differential vectors forward in time representing different amounts of pupil dilation (e.g., the three differential vectors 608, 610, 612 shown in FIG. 6A). The trajectory is longest at the pupil and has to be properly scaled during synthesis, as described in more detail below. The differential vectors are referred to herein as trajectories. The differential vectors (trajectories) for each patch can be included in the eye database 214. The seven differential vectors total 21 additional dimensions that are added to the three color channels for synthesis. In some examples, to avoid redundant storage, only the four vectors corresponding to top, top-right, right, and bottom-right may be needed.

The iris model generation engine 206 can perform trajectory scaling to account for different deformation trajectories across the iris. For example, the synthesis algorithm can place patches at different radii than they were taken from in the exemplar. Even though this radius difference is limited to a range (e.g., ±5%, ±7.5%, ±10%, or other suitable range), the iris model generation engine 206 still needs to adjust for the fact that deformation trajectories closer to the pupil are longer than trajectories closer to the limbus (e.g., as shown by the differential vectors 608, 610, 612 being longer than the differential vectors of the set of differential vectors 614). Therefore, the difference vectors of each trajectory are scaled by:

$$p = \frac{r_l - r_{to}}{r_l - r_{from}} \quad (11)$$

where $r_{from}$ is the radius at which the patch is extracted and $r_{to}$ the radius where it is placed. The term $r_l$ is the limbus radius at which no deformation is assumed.

Reconstruction of the iris can then be performed. The synthesized differential vectors in the final iris texture are assembled to a linear Laplacian system for generating the final iris geometry. Since all vectors are relative, the system may be under-conditioned and additional constraints may need to be provided. One constraint that can be used is to constrain the positions of the pupil, which ensures a faithful fit to the observed pupil. Since the geometry is encoded in cylindrical coordinates, the angular dimension (radians) needs to be appropriately scaled to render it compatible with the radial (mm) and height (mm) dimensions. For example, the angular dimension can multiplied by the average iris radius present in the eye database 214 (e.g., 5 mm or other value based on the iris radii in the eye database 214).

Based on the texture synthesis and geometry synthesis, an iris model parameterized by the control map is generated. The iris model allows high-resolution geometric and texture reconstructions using constrained synthesis given the database 214 of eyes as exemplars.

The eye model can be completed by generating a model for synthesizing the sclera. The most dominant feature of the sclera are the veins, which contribute substantially to the visual appearance of the eye. Depending on the physical and emotional state of an actor or character, the appearance of the veins changes. For example, veins may swell when the eye is irritated or when the actor or character is tired, causing a "red eye" effect. Veins also travel under the surface of the sclera at varying depths. Deeper veins appear thicker and softer, while veins at the surface appear more pronounced.

The vein model generation engine 208 can generate a parametric vein model that models the different states of veins. The parametric vein model allows the continuous change of parameters and blending between different states during animation. Also, in addition to modeling changes, additional detail can be created that are not visible in the input data. As described in more detail below, the parametric vein model grows veins from seed points following a parameter configuration (called recipes). The vein model and how the vein network is synthesized is described below, in addition to how the synthesized veins are rendered to create the sclera texture, including a synthesized normal map to provide fine-scale geometric details on the surface.

Figure 7:
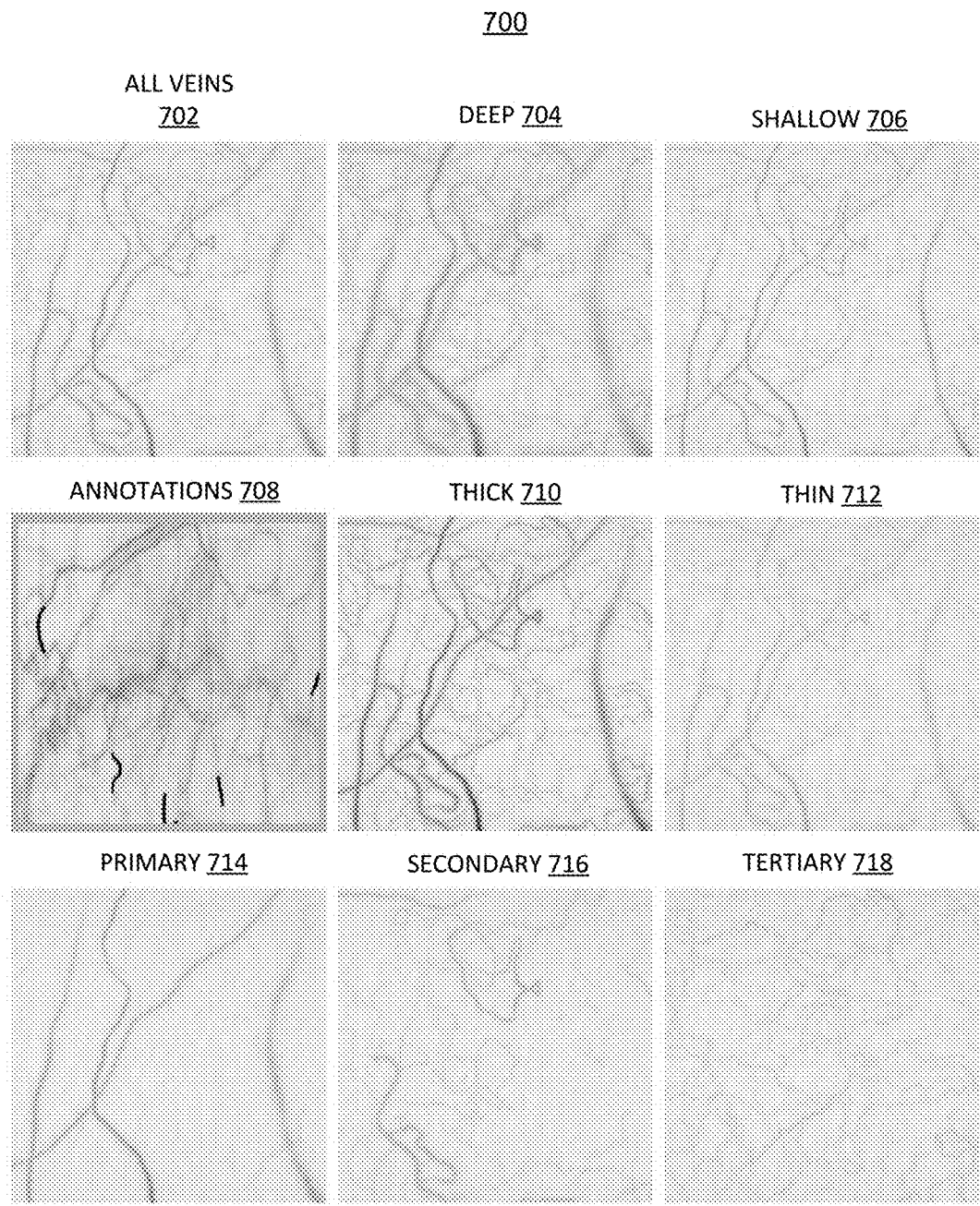
FIG. 7 illustrates an example of veins of a sclera, in accordance with an embodiment of the application.

FIG. 7 shows an example of veins on a sclera. As shown in FIG. 7, veins of a real sclera exhibit an enormous visual richness and complexity, caused by the superposition of a large number of veins with varying properties. For example, properties of veins include color, thickness, scale, shape, and sharpness. To resemble the complex structure, the sclera vein network is modeled as a forest, where an individual tree corresponds to the vein network generated from a single large vein. The large veins are the most salient structures when looking from afar, and are referred to herein as primary level veins (e.g., primary 714). Primary level veins branch off into smaller second (e.g., secondary 716), third (e.g., tertiary 718), and lower level veins. A vein network is created based on a set of rules, which control the vein properties.

The parametric vein model allows the manipulation of the appearance of the veins 702 using a parameter for thickness and one for depth. The vein appearance can be computed from an annotated exemplar texture (the outlined segments in the annotations 708), and the parametric vein model allows independent manipulation of depth (from deep 704 to shallow 706) and thickness (from thick 710 to thin 712) to control the appearance. As described in more detail below, veins can be defined by different vein recipes for the three different level of vein, including primary 714, secondary 716, and tertiary 718 veins.

The vein model generation engine 208 defines various vein properties. A single vein is represented by a series of positional control points, which are interpolated with a spline to provide a smooth and continuous curve in the texture domain. These positional control points govern the shape of the vein. Similarly, other spatially varying properties can also be discretized along this spline and interpolated when required. The properties that are synthesized include position offsets along the curve normals, the vein thickness, the vein depth (which relates to its visibility), and vein branching points. The discretization is independent per property, as some properties vary more quickly when traversing a vein network. In some examples, to account for the irregularity present in nature, the properties can be defined with a certain amount of randomness. For example, two types of random functions can be used. The first random function follows a Gaussian distribution N, parameterized by the mean and standard deviation. The second random function is a colored noise function C, which is parameterized by the amplitude controlling the amount of perturbation and the spectral power density, which is controlled by the exponent in $1/f^x$ and specifies the color of the noise.

The position offsets are defined by the colored noise function $C_{offset}$ in the range of pink (x=1) and red (x=2) noise. Thickness is specified at the starting point $p_{thickSeed}$, along with a decay factor $p_{thickDecay}$, again perturbed with a colored noise function ($C_{thick}$). Depth is computed as an offset to a given average depth $p_{depth}$, created by adding colored noise ($C_{depth}$). The locations of the branching points and the corresponding branching angles are determined by two Gaussian distributions, $N_{branchPos}$ and $N_{branchAngle}$, respectively.

Vein recipes can be used to guide selection of parameters. For example, the parametric vein model exhibits a large number of parameters, which are required to reflect the complexity observed in nature. However, not every combination of parameters will yield plausible veins, and so the parameter choices can be constrained. To accomplish this, several different sets of parameter configurations can be empirically created that each describe a vein with a different appearance, as observed in the captured imagery. These parameter configurations are referred to herein as vein recipes. In one illustrative example, a set of 24 recipes (10 primary, 6 secondary, and 12 tertiary) can produce vein networks of adequate visual complexity. One of ordinary skill in the art will appreciate that any other suitable number and configuration of recipes can be used. In addition to the parameters described above, the recipes can also prescribe the parameters used for vein growing described below.

Based on the vein parameters and vein recipes, the vein model generation engine 206 can grow the vein using vein synthesis. Vein synthesis can take place in an unwrapped texture domain, with the limbus at the top and the back of the eyeball at the bottom. Veins on the sclera grow from the back of the eyeball to the front, and hence the veins can be grown from bottom to top in the unwrapped domain. Growth of a vein is governed by a step size $p_{step}$ and a direction d at every point. The step size is attenuated during growth by a decay factor $p_{stepDecay}$. The growing direction can be influenced by three factors: (1) a Gaussian distribution $N_\beta$ that provides a general growth bias towards the top of the domain, (2) a second Gaussian distribution $N_\gamma$ that controls how much the vein meanders, and (3) a repulsion term that discourages veins from growing over each other. The repulsion term stems from a repulsion map $\mathcal{R}$ that is computed while growing the veins, by rendering the veins into an image, indicating that a particular area has become occupied. The best growing angle can be computed as $$\alpha = \max_{\alpha}(N_\beta(\alpha) + \varepsilon)(N_\gamma(\alpha) + \varepsilon)(1 - \mathcal{R}(x + d) + \varepsilon). \quad (12)$$

The direction d is computed from the angle α and current step size, and x denotes the current position. Also, $N_\gamma$ is evaluated relative to the last growing angle. Since the terms could fully deactivate each other in pathological cases, a small ε is added to the three terms (e.g., ε=0.001 or other suitable value).

Veins start growing at seed points at the bottom of the texture (in the unwrapped domain) for primary veins, or at branching points for higher levels (secondary and tertiary levels), and growing is terminated if veins reach a pre-described length or grow past the limbus. The primary vein seeds are generated at random positions at the bottom of the texture. In one illustrative example, 10 seeds can be used. The seeds can be generated sequentially. To prevent two seeds from being too close to each other, the vein model generation engine 208 can reject the seeds that are closer than a certain number of pixels (e.g., 300 pixels). In one example, the final texture can be 4096 by 2048 pixels.

Given a synthesized network of veins with spatially varying properties, the veins can be rendered into the texture of a backplate image using an appearance model learned from the eye database 214. As described in more detail below, the backplate image can be derived from the input image 212 and includes an image of the sclera.

The appearance of a vein is influenced by many different factors, such as its diameter, how shallow it grows, its oxygenation, among other factors. An important factor is the depth, which influences the color. The depth of a vein influences the color of the vein because the sclera has a higher absorption coefficient in the red wavelengths, and as a consequence deeper veins appear as blue. The depth also influences the sharpness of the vein, since more subsurface scattering blurs out the cross-profile. Thickness of a vein also plays a central role since thin and thick veins are visually quite different. The depth and thickness parameters are not independent, since thin veins, for example, can only appear close to the surface as they would be washed out if they were deeper in the sclera, and consequently are of a red color. A data-driven approach is used to map depth and thickness to appearance determined from exemplary textures in the eye database, as described in the following.

A cross-section model can be used to render the veins. In some embodiments, a number of short vein segments can be labeled (e.g., manually, automatically, or using other techniques) in exemplary textures, which span the vein appearance. In one illustrative example, 60 short vein segments can be labeled. From these segments, cross-section profiles of the RGB space are sampled by fitting an exponential along the profile:

$$c(r) = c_{bkgnd} - \delta\exp\left(\frac{-\|r\|_1}{2\psi}\right), \quad (13)$$

where r is the distance from the labeled vein along the profile, in pixels. The fitting estimates thickness ψ, depth δ, and background color $C_{bkgnd}$ of these cross-sections. Subtracting the background from the cross-section allows the model to be added to any background texture.

Given the synthesized thickness ψ and depth δ, all samples with similar depth and thicknesses can be retrieved from the labeled veins, where similarity is computed as Euclidean distances on normalized values. In some examples, a similarity threshold can be set to a percentage of the distance to one or more nearest neighbors. In one illustrative example, a similarity threshold is set to 1.1 times the distance to the third nearest neighbor. The retrieved cross-profiles are scaled to match to the query parameters, and the final cross-profile used for rendering is computed as their weighted average. In some examples, the weights are set to 1-distance/threshold.

The cross-section model allows a cross-section for any pair of thickness and depth parameters to be computed. Finally, the cross-section model is evaluated for each pixel in the neighborhood of a vein with the local width and depth, and added to the backplate.

As noted above, the veins can be rendered into the texture of a backplate. The vein model describes the vein network, but not the background into which the veins are to be rendered. The backplate provides the background. The background contains two components, including the low-frequency variation and the high-frequency structure of the sclera texture. The mid-frequency features are provided by the vein model.

The high-frequency component accounts for visual noise and imperfections. This high-frequency texture can be created by copying (e.g., manually or automatically) sclera patches that contain no veins from the database textures. Since the high-frequency texture does not contain any recognizeable structures (e.g., it is mostly white), the same high-frequency components can be employed for every eye.

The low-frequency variation component can be extracted from the smoothed input images with the intent to match the perceived overall color variation. Since only parts of the sclera texture can be computed from the images, the low-frequency component of the sclera can be extrapolated to the entire eyeball by fitting a smooth spline surface to the visible parts of the texture. The spline surface is cyclic in the horizontal direction so that the left and right border match seamlessly. The bottom of the texture (in the unwrapped domain) can also be constrained to a reddish hue since there is no data present at the back of the eyeball and visually eyes appear more red near the back of the eye (corresponding to the bottom in the unwrapped domain).

The high- and low-frequency components are combined into a single backplate image, into which the veins are rendered. An example of a final vein texture is shown in FIG. 7 in the image 702 with all veins. The impact of the depth parameters (deep 704 and shallow 706 veins) and thickness parameters (thick 710 and thin 712 veins) are also shown in FIG. 7.

The geometric surface details (e.g., bumps or other geometric features) of the sclera are important for the visual appearance of the eye since the surface details can affect the shape of specular highlights. For example, bumps on the surface of the sclera can include a mix of random bumps and displacements that correlate with the positions of big veins. A normal map can be created based on a combination of procedural noise and displacements that follow the thick veins to render results. For example, both the procedural noise and the veins can be used to create a height map, which is then transformed into a normal map.

The parametric eye model (including the eyeball model, the iris model, and the vein model) generated by the eye model engine 202 is able to synthesize all visible parts of the eye, including the eyeball, the iris, and the sclera veins. The model parameters can be estimated by fitting the eye model to face scans (e.g., 3D face scans or other suitable scans), single images, artistic portraits, or other images. The parametric eye model allows the creation of a wide range of realistic eyes based on a few parameters and an iris control map. The parameters can be estimated automatically, and the iris control map can extracted from various sources, which is discussed in more detail below. The following discussion includes two different example use-case scenarios. In a first use-case, it is demonstrated how the proposed fitting technique may be used to complement existing photogrammetric face scanners to augment the facial geometry, which is inaccurate for the eye itself, with high-quality eye reconstructions. In a second use-case, it is shown how the fitting technique can be used to compute eye geometry and textures from single, uncalibrated input images.

In the multi-view fitting use-case, the eye model can be fit to a 3D face scan provided by a multi-view stereo (MVS) reconstruction algorithm. Any system that provides calibrated cameras and 3D geometry can be used to provide the multi-view face scans. The MVS algorithm reconstructs the white sclera well since the surface of the sclera is mostly diffuse. In some instances, the white sclera reconstruction may a t lower quality than skin due to strong specular reflections which result in a noisier surface. The parametric eye model can serve as a regularizer to get rid of the noise. Other parts of the eye, such as the cornea or the iris, can be a greater challenge, as they are either invisible or heavily distorted. The parametric eye model can fully replace any existing 3D data and rely solely on the imagery to reconstruct geometry and texture. The fitting of the model can be performed on a single face scan or on multiple face scans with different eye gazes simultaneously.

The fitting technique using the parametric eye model can begin with eyeball fitting. For example, the input images from the face scan or other input can be annotated (e.g., either manually or using automated annotation techniques) by labelling the limbus a first color (e.g., red or other suitable color), the pupil a second color (e.g., black or other suitable color), the sclera a third color (e.g., white or other suitable color), and the iris a fourth color (e.g., green or other suitable color). In examples in which the features are labeled manually, the labelling is quick. The labeling can be automated with existing eye detection techniques. Based on the input mesh (of the one or more input scans) and the annotations (or labels), the parameters for each eye can be estimated. In some examples, the estimated parameters include the rigid transformation of the model to match the input mesh, the scale, the coefficients of the deformable model, as well as the radius and position of the pupil, yielding a total of 14 unknowns for a single eye. The rigid transformation parameters determine and/or affect the $E_{sclera}$ and $E_{limbus}$ energies. For example, for each set of rigid transformation parameters, a corresponding $E_{sclera}$ and $E_{limbus}$ energy can be computed. The fitting technique determines the rigid transformation parameters which minimize the $E_{sclera}$ and $E_{limbus}$ energies. The scale parameter defines the overall size of the eye. The coefficients of the deformable model can include the PCA mode coefficients. For example, as described above, the deformable eyeball model includes a mean mesh plus a set of deformation modes (e.g., the PCA modes). Each of the deformation modes is weighted by a coefficient.

The orientation of the pupil can be constrained by the eye model to the average pupil orientation of the eye database 214. The fitting can be based on four weighted energy terms that can be minimized to find the fit of the eye model to the input mesh. The four weighted energy terms form the total energy $E_{total}$ to be minimized as follows:

$$E_{total} = \lambda_s E_{sclera} + \lambda_l E_{limbus} + \lambda_p E_{pupil} + \lambda_c E_{coeff}. \quad (14)$$

The sclera energy term ($E_{sclera}$) penalizes the distance between the model mesh M and the sclera mesh Z from the face scan, and is defined as:

$$E_{sclera} = \frac{1}{|\mathcal{Z}|} \sum_{x_i, n_i \in \mathcal{Z}} \|\langle (x_i - x(x_i, M)), n_i \rangle\|^2 \quad (15)$$

where $x_i$ are the sclera mesh points and their closest points on the model are $x(x_i, M)$. Distance can be constrained only along the normal $n_i$, which allows tangential motion. The sclera mesh can be segmented from the full face mesh using the sclera and limbus annotations.

The limbus energy term ($E_{limbus}$) penalizes the distance between the projection of the model limbus into the viewpoint and the limbus annotations:

$$E_{limbus} = \frac{1}{|L^S|} \sum_{y_i \in L^S} \|y_i - \phi(y_i, L^M)\|^2, \quad (16)$$

where $y_i$ are the limbus annotations and their closest points to the projected model limbus are $\phi(y_i, L^M)$. The viewpoint is the projection center of the camera. The 3D model limbus points are projected into the 2D image using the projection center.

Similarly, the pupil energy term ($E_{pupil}$) penalizes deviation of the projected model pupil from the pupil annotations. Unlike the limbus energy, the pupil energy has to take into account the refraction taking place at the cornea interface when projecting the pupil into the camera. For the refraction computation, a continuous spline approximation of the cornea surface can be used. The spline approximation simplifies the implementation of the refraction computation, since it provides a continuous representation of the surface. The spline approximation can be used for the refraction computation instead of using the mesh, which is a piecewise linear shape.

The last term corresponds to the coefficient term defined in equation 4. All terms can be weighted equally (e.g., all lambdas can be set to 1 or other suitable value). In some examples, the weights can be different for the different terms.

Since this is a highly non-linear energy, the energy can be optimized iteratively following an Expectation-Maximization (EM) schema. In the E-step of the EM, all the correspondences can be recomputed based on the current estimate of the eye model, and in the M-step the correspondences can be fixed and the parameters can be optimized for using the Levenberg-Marquart algorithm. In one illustrative example using such techniques, the optimization can converge in approximately 5 iterations.

The iris and the veins can be applied to the fitting in either order or at the same time. As noted above, the iris control map can be computed or obtained during fitting. The optimization above for the eyeball fitting yields the eyeball geometry and a fitted pupil. The fitted pupil is used to create a proxy iris (referred to as a disk). An iris control map can be computed by projecting the input image(s) onto this proxy iris. As this disk only approximately corresponds to the real iris geometry, each view (in the multi-view example) will produce a slightly different iris texture. Since the cameras of the MVS system frame the full head and may lack resolution in the eye area, zoomed in cameras (e.g., two zoomed in cameras) can be used to compute the iris texture. From the zoomed in cameras, the zoomed in camera producing the sharpest texture can be selected as the primary view (e.g., selected manually or automatically by the fitting engine 210). In the example in which two zoomed in views are used, the other view (the non-selected view) can be used to fill in the highlights only. For example, the texture areas, which can be completely white due to the highlight, can be replaced with the corresponding patch from the other texture. The algorithm computes a highlight probability map by detecting saturated image values for each view and combines the iris texture maps according to:

$$C = \frac{C_p w_p + C_s(1 - w_p)w_s}{w_p + (1 - w_p)w_s}, \quad (17)$$

where $C_p$ and $C_s$ are the colors of the primary and secondary textures, and $w_p$ and $w_s$ are the highlight probability maps. As discussed above with respect to the iris model, the resolution of the control map depends on the resolution of the input images. In one illustrative example setup, the resolution of the control map in polar coordinates is 256×64 pixels.

As discussed above with respect to the vein model, the veins are rendered into the backplate image, which can be obtained form the input scans. The backplate image includes combined high- and low-frequency components, as described above.

The fitting engine 110 can perform eye pair fitting. For example, the properties of a pair of eyes are typically highly correlated. This correlation can be leveraged to reduce the dimensionality of the fitting task from, for example, naively 28 dimensions to 21. Since it is reasonable to assume that the eyes have a similar (but antisymmetric) shape, the same shape coefficients and scale can be used for the second eye that were determined for the first eye. Furthermore, the rigid transformation of the second eye is linked to the first and can be reduced from 6 to 3 degrees of freedom, one for the vergence angle and two for the inter-ocular vector. The remaining parameters are then pupil radius and position, which may differ between the two eyes.

Figures 8A, 8B:
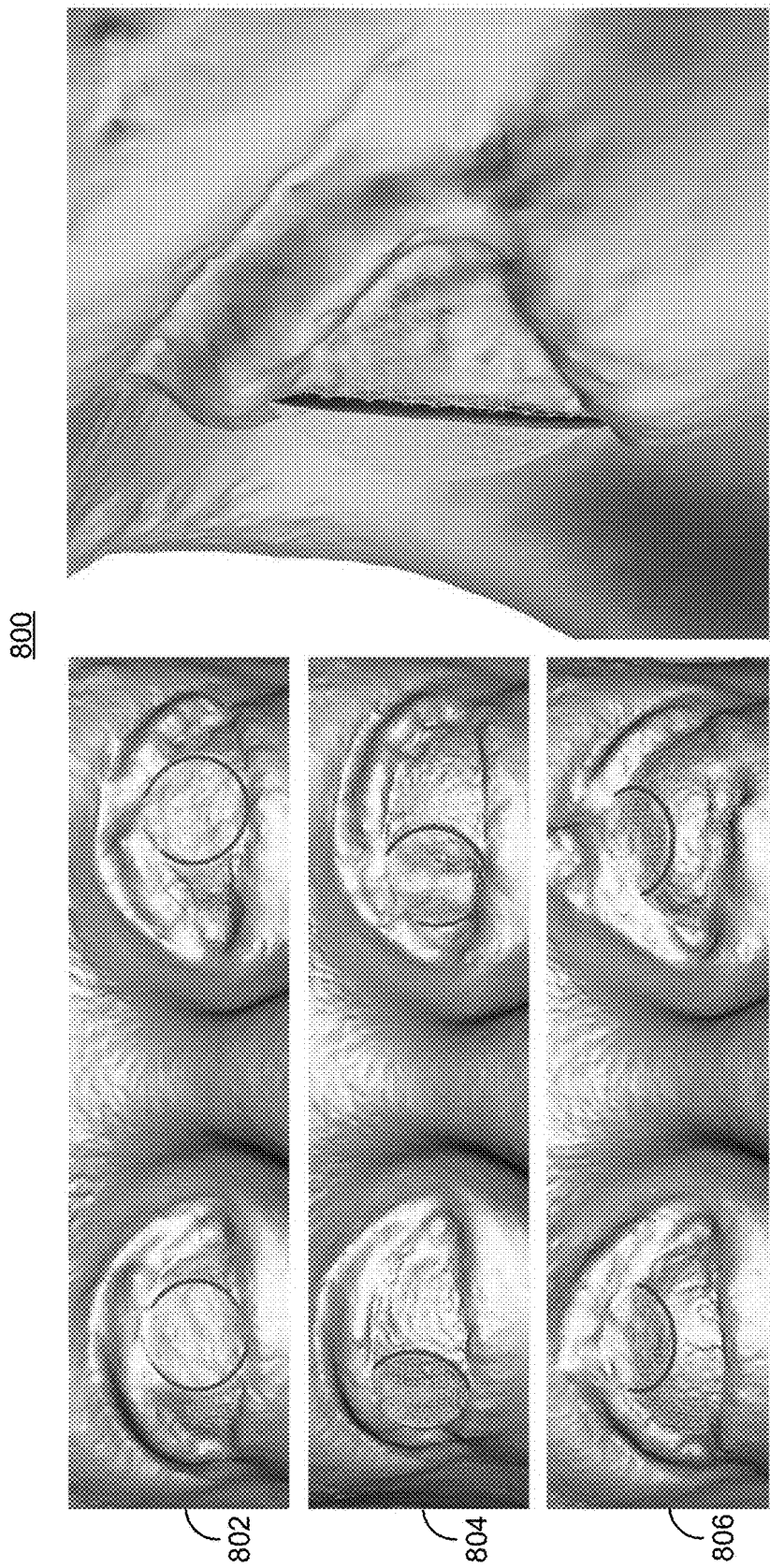
FIG. 8A illustrates an example of a front view of a result of a fitting technique applied to multiple poses, in accordance with one embodiment of the application.
FIG. 8B illustrates an example of a side view of a result of a fitting technique applied to multiple poses, in accordance with one embodiment of the application.

Multi-pose fitting can also be performed. For example, if it is assumed that the shape of the eyeball is rigid, multiple eye poses can be leveraged to better constrain the optimization. The shape coefficients and global scale, as well as the inter-ocular vector can then be shared amongst all poses, as are the pupil positions. FIG. 8A shows a front view of an example of a result of multi-pose fitting and FIG. 8B shows a side view of the multi-pose fitting result, where the parameters are jointly optimized based on three poses. For example, multiple eye poses can be leveraged to better constrain the fitting optimization. The example shown in FIG. 8A and FIG. 8B includes a simultaneous fit to three poses 802, 804, and 806.

In the single image fitting use-case, fitting the parametric eye model to a single image is much less constrained than the multi-view scan fitting, since less data is available. The single image fitting also cannot rely on depth information and also does not have multiple views to constrain the optimization. By making one or more assumptions, the parametric eye model is able to extract plausible model parameters for a given image.

The optimization for single image fitting is based on the same energy formulation as the multi-view case defined in Equation 14. However, since 3D information is unavailable, the sclera term is removed from Equation 14. Using modified equation 14 (with the sclera term removed), the fitting technique for a single image requires just limbus and pupil annotations, and relies stronger on the model prior. For example, the scale of the eye can be a fixed value (e.g., fixed to 1) due to the inherent depth/scale ambiguity in the monocular case. Furthermore, the position of the model pupil can be relied upon and the fitting engine 210 can optimize for pupil radius only. To project the limbus and pupil into the image, the fitting technique can require a rough guess of the camera parameters (e.g., focal length and sensor size), which can be provided manually or extracted from meta-data (EXIF).

Results of the above-described systems and techniques are now described. The performance of the proposed systems and techniques are demonstrated on a variety of input modalities, ranging from constrained multi-view scenarios to lightweight reconstruction from single images. Before showing fitting results, the benefits of the parametric eye model for manipulation are we demonstrated.

Figure 9:
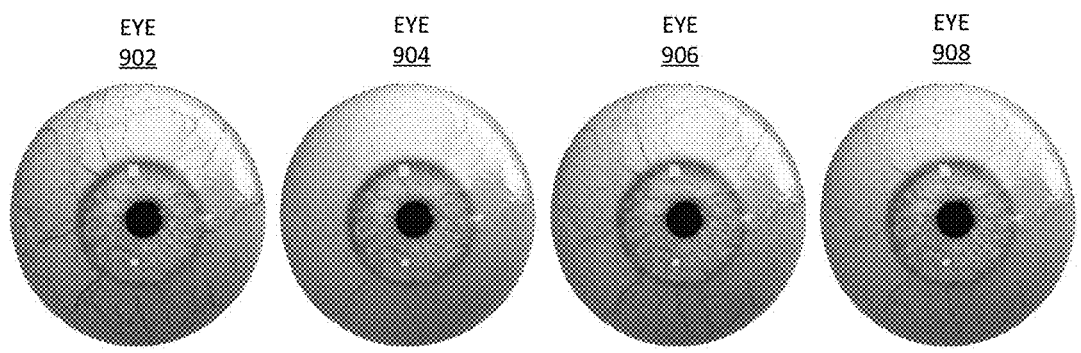
FIG. 9 illustrates an example of eyes with a parametrically controlled sclera vein network and appearance, in accordance with one embodiment of the application.

The appearance of the vein network in the sclera varies as a function of the physiological state of the person, leading to effects such as red eyes caused by fatigue. Since the sclera vein network and appearance can be parametrically controlled using the vein model, such physiological effects can be simulated. The parametric vein model can account for such effects (and others) as shown in FIG. 9. The depth at which veins grow is globally changed from shallow (in the eye 902) to deep (in the eye 904), which influences their visibility. The overall vein thickness is also globally changed from thick (in the eye 906) to thin (in the eye 908).

Figure 10:
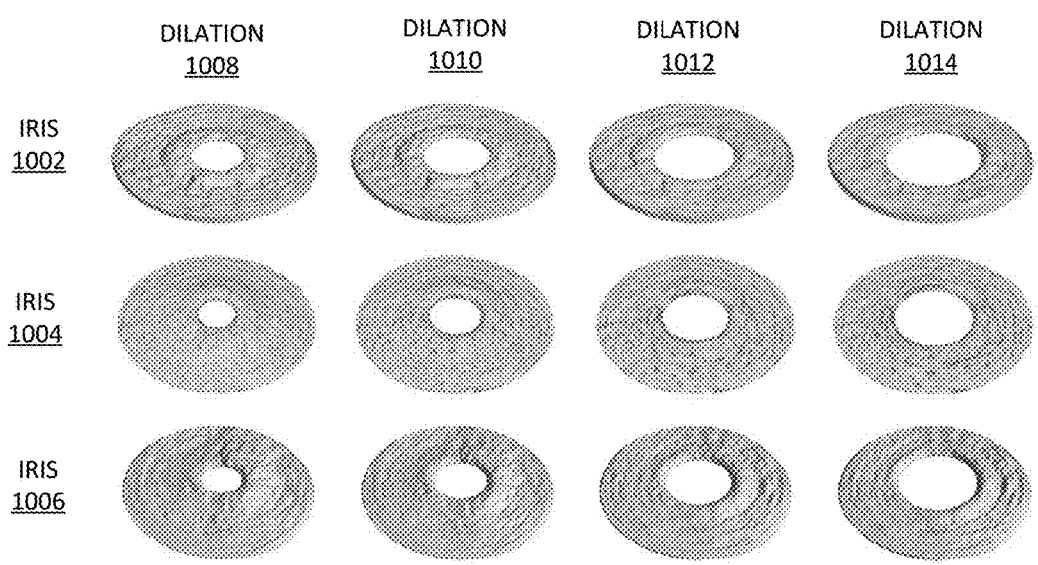
FIG. 10 illustrates an example of different irises with varying geometries based on pupil dilation, in accordance with one embodiment of the application.
Figure 11:
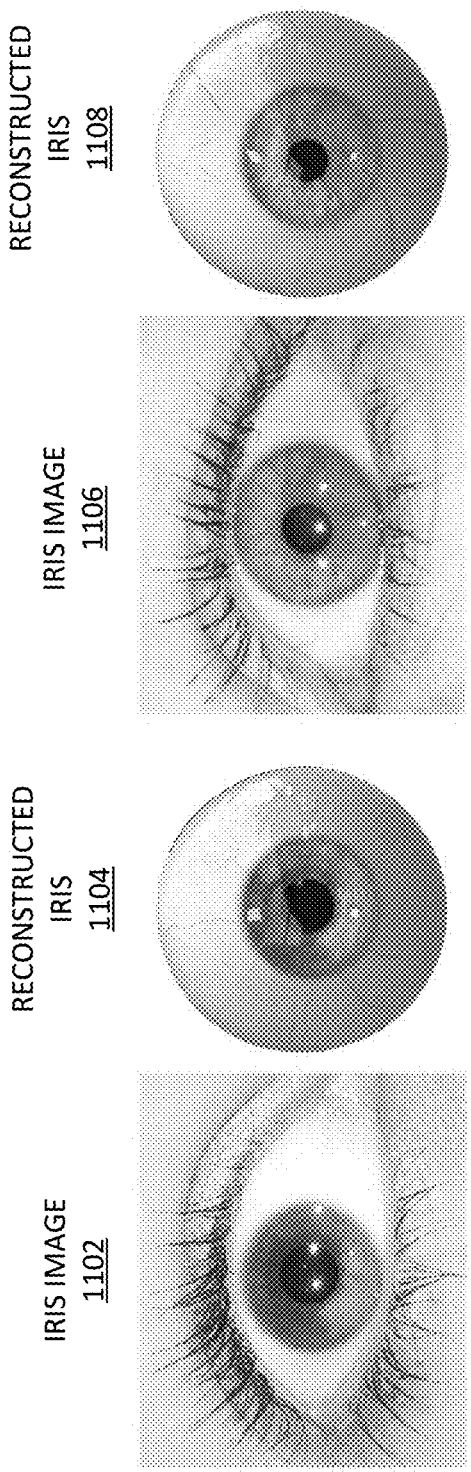
FIG. 11 illustrates an example of reconstructed complex irises, in accordance with one embodiment of the present invention.

Since the complete dilation stack of an iris is reconstructed, the pupil size can be manipulated to account for virtual illumination conditions or to simulate some physiological effects, such as hippus, which is an oscillation of the pupil diameter. FIG. 10 shows three different irises (iris 1002, iris 1004, and iris 1006) at four different dilation stages (dilation 1008, dilation 1010, dilation 1012, and dilation 1014). The iris model nicely models the geometric detail that varies as the pupil dilates from left to right (from dilation 1008 to dilation 1014). Since geometric detail is inherently linked to the color of an iris, realistic microstructure can be synthesized. For example, the three irises 1002, 1004, 1006 differ in color, ranging from brown (iris 1002) to blue (iris 1004) to dichromatic (iris 1006). The different geometric surface structure can be seen in the different irises 1002, 1004, 1006, which is inherently linked to the color. For example, brown irises are smoother (iris 1002) and blueish irises (iris 1004) are more fibrous. Since the model generating technique described above generates the structure of the iris as a function of the iris color, the structure can be indirectly controlled by changing the color of the iris. In the special case of the dichromatic iris that mixes gray-green and red-brown colors (iris 1006), the model generation technique described above produces structural details that vary spatially and that match the color. The dichromatic iris 1006 corresponds to the reconstructed iris 1108 shown in FIG. 11. For example, the fitting technique is able to reconstruct complex dichromatic irises by combining different color exemplars from the eye database 214.

Figure 13:
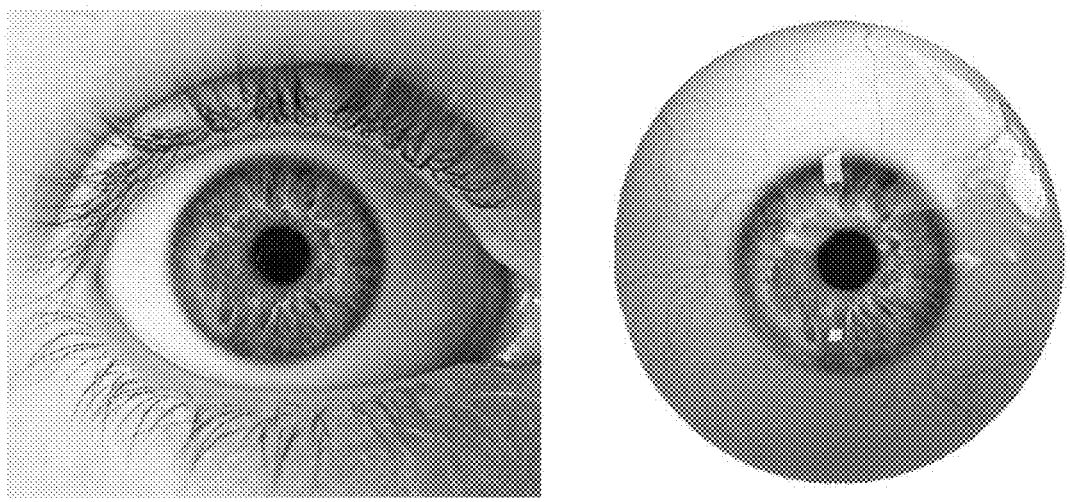
FIG. 13 illustrates an example of an eye reconstructed by fitting the eye model to a single image, in accordance with one embodiment of the application.

A result of being able to reconstruct eyes from single images is shown in FIG. 13. As shown, the reconstruction provides a truly lightweight method to create high-quality computer-generated (CG) eyes from photographs (e.g., Internet photographs or other photographs). The reconstruction not only create high-quality CG eyes from photographs, but also from artistic renditions, such as sketches or paintings and even extending beyond human eyes, such as reconstruction of eyes of animals. For example, the robustness of the fitting technique provides the system the ability to fit eyes even to artistic paintings and single images of animals.

Figure 12:
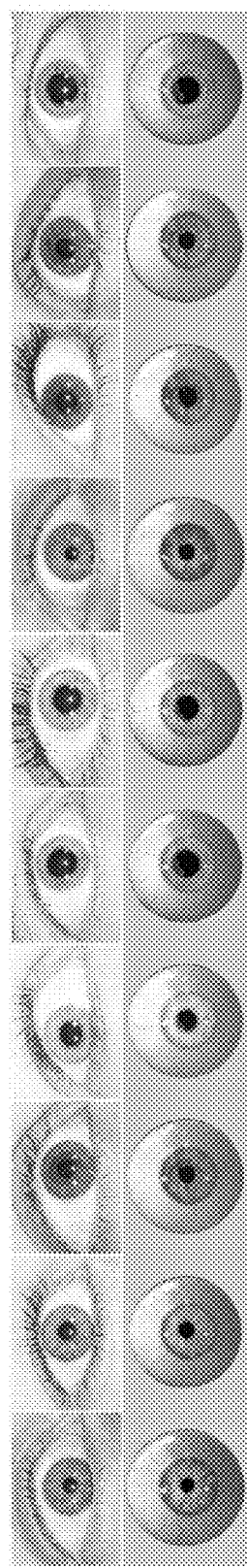
FIG. 12 illustrates an example of a variety of different reconstructed eyes with varying eyeball shape, iris structure, and color, and synthesized scleras with vein textures and surface details, in accordance with one embodiment of the application.
Figure 14:
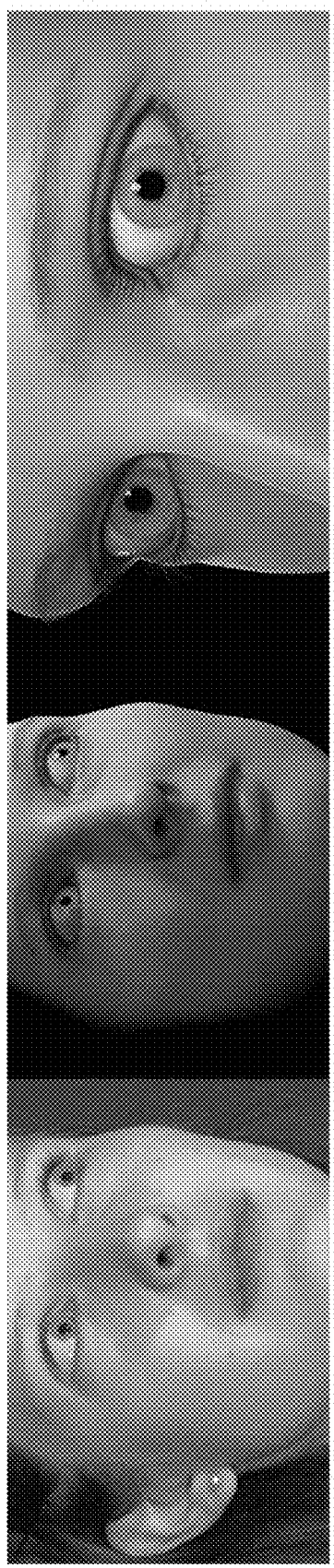
FIG. 14 illustrates an example of an eye reconstructed by fitting the eye model to images from a multi-view face scanner, in accordance with one embodiment of the application.

The fitting technique using the parametric eye model can reconstruct a variety of different eyes with varying eyeball shape, iris structure and color, and can synthesize realistic scleras with vein textures and surface details. FIG. 12 shows reconstruction results on a variety of different eyes, all captured in the multi-view setup and reconstructed using the multi-view fitting technique described above. The eyes shown in FIG. 12 exhibit varying iris color and structure, eyeball shape, and sclera vein networks. Since the technique operates on the same input data as multi-view face reconstruction algorithms, namely a set of calibrated images, the technique seamlessly integrates with existing facial capture pipelines and augments the face by adding eyes, one of the most critical components, as can be seen in FIG. 14. As shown in FIG. 14, the parametric eye model and image-based fitting technique allows for lightweight eye capture at very high quality, and can be integrated with traditional multi-view face scanners.

Using the techniques described herein, a parametric model of 3D eyes is built from the database 214 of eyes (e.g., high-resolution eye scans) with both geometry and texture. The parametric eye model contains a shape subspace for the eyeball, a coupled shape and color synthesis method for the iris parameterized by a low-resolution control map, and a sclera vein synthesis approach also with tunable parameters to generate a variety of realistic vein networks. The image-based fitting technique allows the parametric eye model to be fit to lightweight inputs, such as common facial scanners, or even single images or photographs. The parametric eye model and fitting approach allow simple and efficient eye reconstructions, making eye capture a more viable approach for industry and home use. The eye model also allows to manipulate the captured data as it is fully parametric, such as changing the amount and appearance of sclera veins to simulate physiological effects or controlling the pupil size to have the eye react to synthetic illumination.

Figure 15:
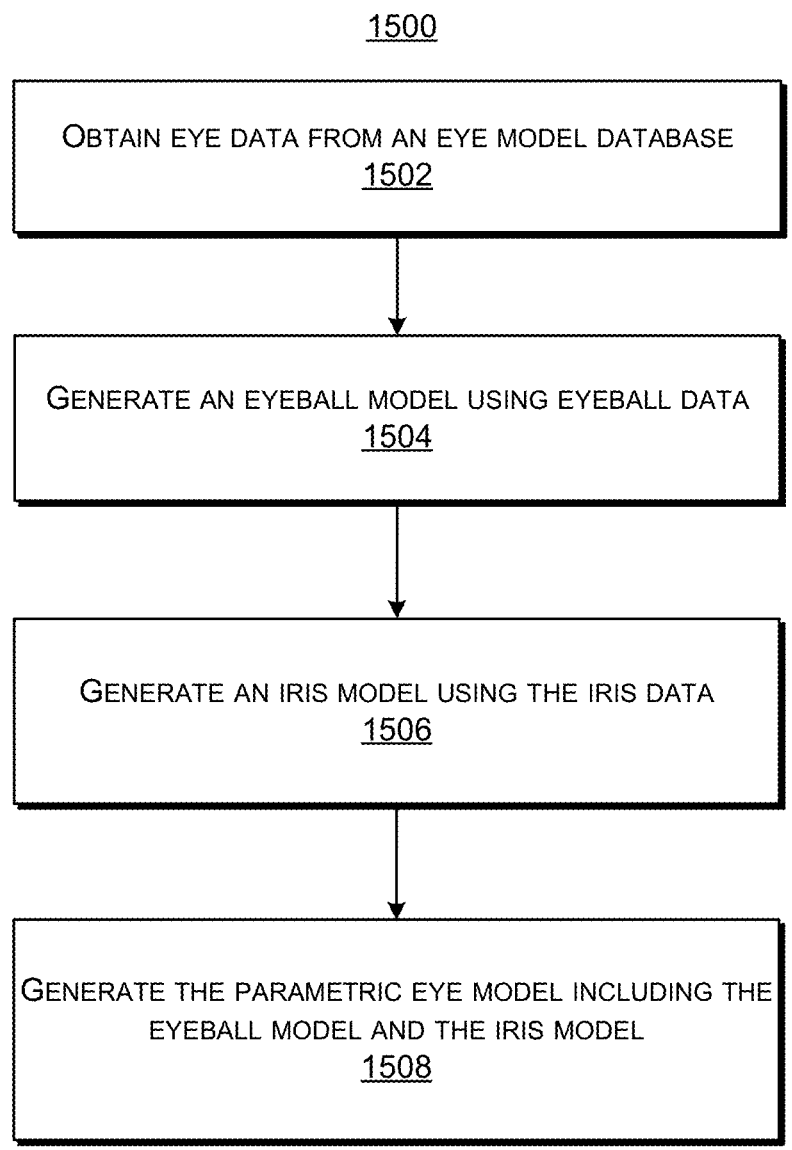
FIG. 15 illustrates an example of a process of generating a parametric eye model, in accordance with one embodiment of the application.
Figure 16:
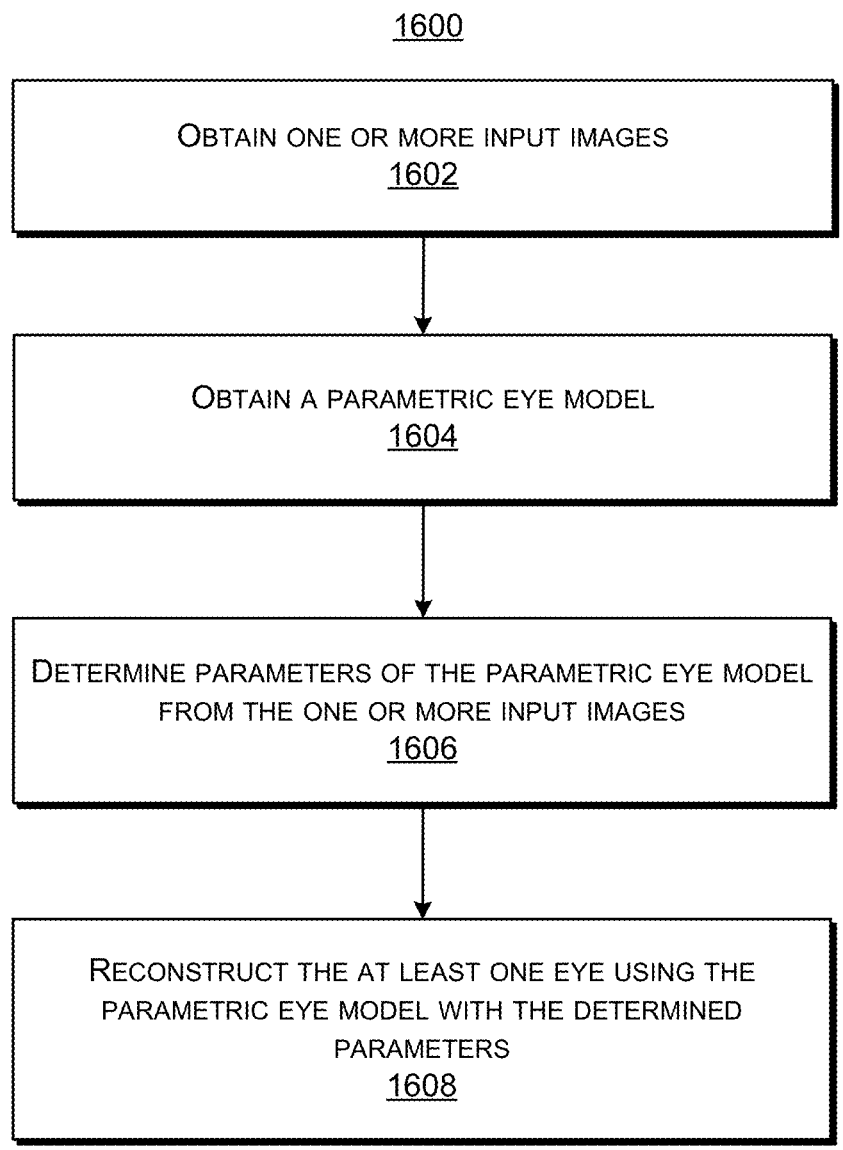
FIG. 16 illustrates an example of a process of reconstructing one or more eyes, in accordance with one embodiment of the application.

FIG. 15 illustrates an example of a process 1500 of generating a parametric eye model of one or more eyes. FIG. 16 illustrates an example of a process 1600 of reconstructing one or more eyes. Processes 1500 and 1600 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1500 and 1600 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 1500 of generating a parametric eye model of one or more eyes may be performed by a computing device, such as the eye model engine 202 shown in FIG. 2. In some examples, the eye model engine 202 can be implemented by the computer system 1800.

At 1502, the process 1500 includes obtaining eye data from an eye model database. The eye data includes eyeball data and iris data corresponding to a plurality of eyes. An example of the eye model database includes the eye database 214 described above.

At 1504, the process 1500 includes generating an eyeball model using the eyeball data. Generating the eyeball model includes establishing correspondences among the plurality of eyes. In some embodiments, the eyeball model includes a principal component analysis (PCA) model or a morphable model (or other geometric model) built from the plurality of eyes in correspondence. In some examples, the eyeball model includes a mean shape of the plurality of eyes and a plurality of principal modes of variation, the plurality of principal modes of variation corresponding to variation among shapes of the plurality of the eyes.

In some examples, establishing correspondences among the plurality of eyes includes rigidly aligning each shape of each of the plurality of eyes with the eyeball model, and fitting the eyeball model (e.g., the mean shape of the plurality of eyes) with a subset of the plurality of principle modes of variation of the eyeball model to each rigidly aligned shape of the plurality of eyes. In such embodiments, establishing the correspondences further includes non-rigidly deforming the fitted eyeball model to each shape of each of the plurality of eyes, and updating the eyeball model using all the non-rigidly deformed eyeball models. All the non-rigidly deformed eyeball models include each instance of the fitted eyeball model being non-rigidly deformed to an eyeball shape, resulting in a non-rigidly deformed fitted eyeball model for each eyeball shape of the plurality of eyes.

At 1506, the process 1500 includes generating an iris model using the iris data. Generating the iris model includes sampling one or more patches of one or more of the plurality of eyes using an iris control map and merging the one or more patches into a synthesized texture. In some embodiments, sampling the one or more patches using the iris control map includes determining a plurality of saliency values for a plurality of patches of the iris control map. The plurality of saliency values define an order in which the plurality of patches are synthesized into the iris model. In such embodiments, sampling the one or more patches using the iris control map further includes sampling the one or more patches according to the plurality of saliency values determined for the plurality of patches. In some embodiments, the process 1500 further includes combining high resolution frequencies of the synthesized texture with low resolution frequencies of the iris control map.

In some embodiments, generating the iris model further includes determining geometries for the iris model over a plurality of pupil dilations. The geometries are indicated by vertex information of the one or more patches. For example, the vertex information for a vertex of a patch includes a position of the vertex relative to one or more neighboring vertices (as shown in FIG. 6A). In such embodiments, generating the iris model further includes synthesizing the geometries into the iris model.

At 1508, the process 1500 includes generating the parametric eye model. The parametric eye model includes the eyeball model and the iris model. In some embodiments, the process 1500 further includes generating a vein model including a vein network. Veins in the network are grown from seed points in directions and by amounts controlled by one or more vein recipes. In such embodiments, the parametric eye model includes the vein model.

In some embodiments, the process 1500 further includes obtaining an input image and reconstructing the one or more eyes using the parametric model. Reconstructing the one or more eyes using the parametric model includes determining parameters of the parametric eye model that match one or more eyes in the input image.

As previously noted, FIG. 16 illustrates and example of a process 1600 of reconstructing one or more eyes. In some aspects, the process 1600 may be performed by a computing device, such as the eye model engine 202 shown in FIG. 2. In some examples, the eye model engine 202 can be implemented by the computer system 1700.

At 1602, the process 1600 includes obtaining one or more input images. The one or more input images include at least one eye. In some aspects, the one or more input images include a three-dimensional face scan from a multi-view scanner. The three-dimensional face scan can include a scan of at least a portion of a face including the at least one eye. For example, the scan can include a portion of the face surrounding both eyes, a portion of the face around one eye, the entire face, or any other suitable portion of the face. In some aspects, the one or more input images include a single image.

At 1604, the process 1600 includes obtaining a parametric eye model. The parametric eye model includes an eyeball model and an iris model. In some examples, the parametric eye model includes a vein model.

At 1606, the process 1600 includes determining parameters of the parametric eye model from the one or more input images. The parameters are determined to fit the parametric eye model to the at least one eye in the one or more input images. The parameters include a control map used by the iris model to synthesize an iris of the at least one eye. In some embodiments, determining the control map includes determining a disk centered at a pupil of the at least one eye in the one or more images. The disk corresponds to the iris of the at least one eye. The disk can be determined based on the minimization of the sclera, limbus, and/or pupil between the model and the at least one eye, as described above. In such embodiments, determining the control map further includes projecting the one or more images onto the disk. The disk can then be used as the control map.

In some embodiments, the parameters include a shape parameter corresponding to a shape of an eyeball of the at least one eye. In some examples, determining the shape parameter corresponding to the shape of the eyeball includes fitting the eyeball model to the at least one eye in the one or more input images (e.g., the three-dimensional face scan). In some cases, fitting the eyeball model to the at least one eye can include identifying a sclera of the at least one eye in the one or more input images (e.g., the three-dimensional face scan), and minimizing a distance between a sclera of the eyeball model and the identified sclera of the at least one eye in the one or more input images (e.g., the three-dimensional face scan). In some cases, fitting the eyeball model to the at least one eye can includes identifying a limbus of the at least one eye in the one or more input images, and minimizing a distance between a limbus of the eyeball model and the identified limbus of the at least one eye. In some cases, fitting the eyeball model to the at least one eye can include identifying a pupil of the at least one eye in the one or more input images, and minimizing a deviation of a pupil of the eyeball model from the identified pupil of the at least one eye. In some cases, the sclera, limbus, and pupil can be minimized between the model and the at least one, as described above.

At 1608, the process 1600 includes reconstructing the at least one eye using the parametric eye model with the determined parameters. The reconstructed eye can be combined with the remaining parts of a subject's reconstructed face depicted in the one or more input images.

As noted above, in some embodiments, the parametric eye model also includes a vein model. In such embodiments, determining the parameters includes determining a vein network for the at least one eye, and reconstructing the at least one eye includes rendering the vein network onto a sclera backplate determined from the one or more images.

Figure 17:
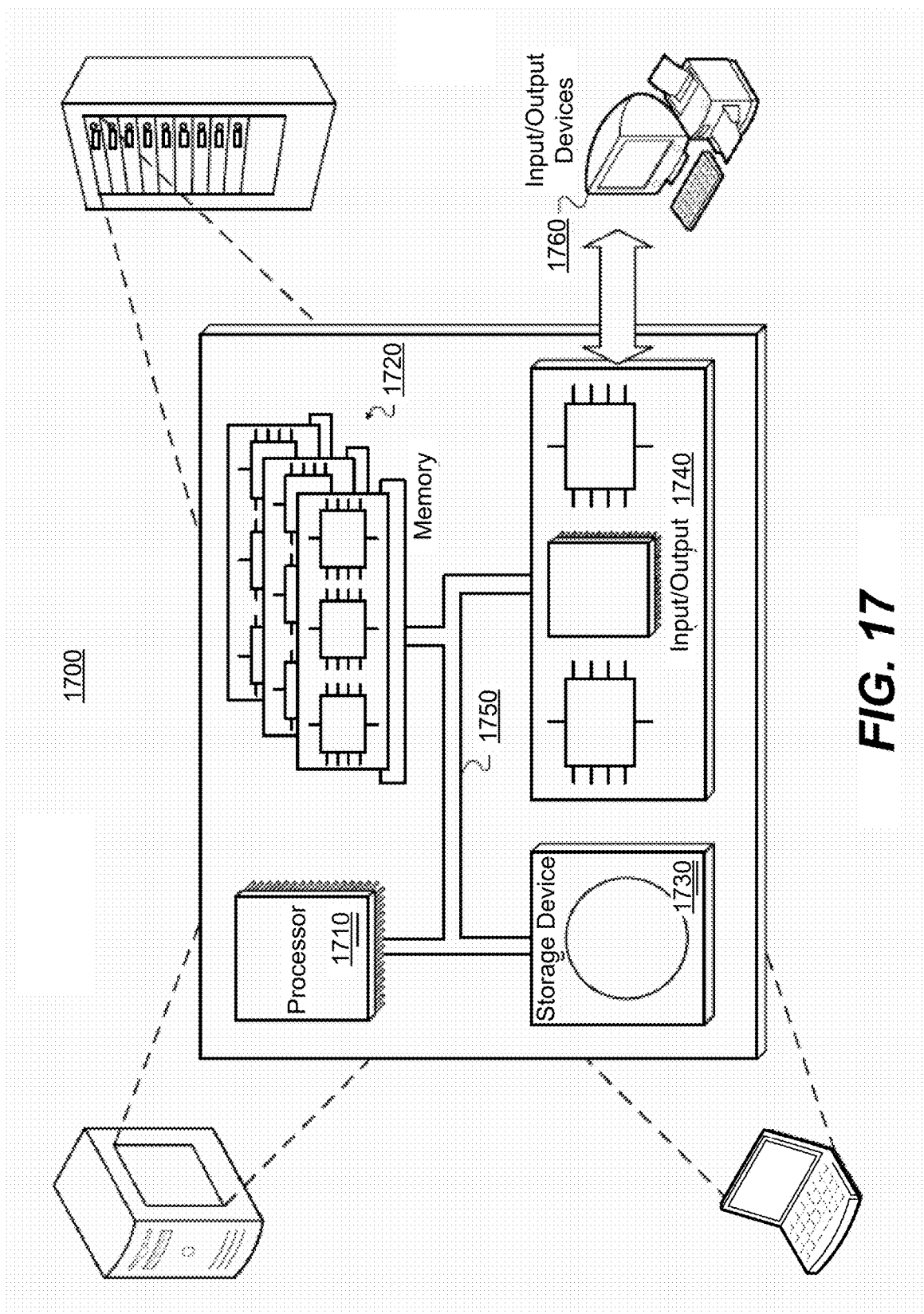
FIG. 17 shows an example of a computer system that may be used in various embodiments of the application.

Referring to FIG. 17, a schematic diagram is shown of an example of a computer system 1700. This system is exemplary only and one having skill in the art will recognize that variations and modifications are possible. The system 1700 can be used for the operations described above. For example, the computer systems shown in FIG. 17 may be used to implement any or all of the initialization (e.g., face annotation, skull fitting, constraint creation) and stabilization (e.g., skin energy or error determination, nose energy or error determination) techniques and routines described herein.

The system 1700 includes a processor 1710, a memory 1720, a storage device 1730, and an input/output interface 1740. Each of the components 1710, 1720, 1730, and 1740 are interconnected using a system bus 1750. The processor 1710 is capable of processing instructions for execution within the system 1700. In one implementation, the processor 1710 is a single-threaded processor. In another implementation, the processor 1710 is a multi-threaded processor. The processor 1710 is capable of processing instructions stored in the memory 1720 or on the storage device 1730 to provide graphical information via input/output interface 1740 for display on a user interface of one or more input/output device 1760.

The memory 1720 stores information within the system 1700 and may be associated with various characteristics and implementations. For example, the memory 1720 may include various types of computer-readable medium such as volatile memory, a non-volatile memory and other types of memory technology, individually or in combination.

The storage device 1730 is capable of providing mass storage for the system 1700. In one implementation, the storage device 1730 is a computer-readable medium. In various different implementations, the storage device 1730 may be a floppy disk device, a hard disk device, an optical disk device, or a tape device.

The input/output device 1760 provides input/output operations for the system 1700. In one implementation, the input/output device 1760 includes a keyboard and/or pointing device. In another implementation, the input/output device 1760 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of generating a parametric eye model of one or more eyes, comprising:
    obtaining eye data from an eye model database, the eye data including eyeball data and iris data corresponding to a plurality of eyes;
    generating an eyeball model of a subject using the eyeball data from the eye model database, wherein generating the eyeball model includes iteratively establishing correspondences among the plurality of eyes and modifying the eyeball model based on the established correspondences, wherein establishing correspondences among the plurality of eyes includes:
        rigidly aligning each shape of each of the plurality of eyes with the eyeball model;
        fitting the eyeball model to each rigidly aligned shape of the plurality of eyes by identifying a limbus of the at least one eye in one or more input images, and minimizing a distance between a limbus of the eyeball model and the identified limbus of the at least one eye;
        generating non-rigidly deformed eyeball models by non-rigidly deforming the fitted eyeball model to each shape of each eye of the plurality of eyes; and
        updating the eyeball model using the non-rigidly deformed eyeball models;
    generating an iris model of the subject using the iris data from the eye model database and an iris control map, the iris control map including a low-resolution representation of an iris of the subject, wherein generating the iris model includes sampling a plurality of patches from the plurality of eyes and merging the plurality of patches into a high-resolution synthesized texture, and wherein sampling of patches from the plurality of eyes is constrained by the iris control map; and
    generating the parametric eye model of the subject, the parametric eye model including the eyeball model and the iris model.

2. The method of claim 1, further comprising:
    generating a vein model including a vein network, wherein veins in the vein network are grown from seed points in directions and by amounts controlled by one or more vein recipes, and wherein the parametric eye model includes the vein model.

3. The method of claim 1, wherein the eyeball model includes a principal component analysis (PCA) model built from the plurality of eyes in correspondence, the PCA model including a mean shape of the plurality of eyes and a plurality of principal modes of variation, the plurality of principal modes of variation corresponding to variation among shapes of the plurality of the eyes.

4. The method of claim 1, wherein iteratively establishing the correspondences among the plurality of eyes and modifying the eyeball model based on the established correspondences includes:
rigidly aligning each shape of each eye of the plurality of eyes with the eyeball model;
fitting the eyeball model to each rigidly aligned shape of each eye of the plurality of eyes;
generating non-rigidly deformed eyeball models by non-rigidly deforming the fitted eyeball model to each shape of each eye of the plurality of eyes; and
updating the eyeball model using the non-rigidly deformed eyeball models.

5. The method of claim 4, wherein the eyeball model includes a principal component analysis (PCA) model built from the plurality of eyes in correspondence, the PCA model including a mean shape of the plurality of eyes and a plurality of principal modes of variation, the plurality of principal modes of variation corresponding to variation among shapes of the plurality of the eyes, and wherein fitting the eyeball model to each rigidly aligned shape of each eye of the plurality of eyes includes fitting a subset of the plurality of principle modes of variation of the eyeball model to each rigidly aligned shape of each eye of the plurality of eyes.

6. The method of claim 1, wherein generating the iris model further includes:
determining geometries for the iris model over a plurality of pupil dilations, wherein the geometries are indicated by vertex information of the one or more patches, wherein vertex information for a vertex of a patch includes a position of the vertex relative to one or more neighboring vertices; and
synthesizing the geometries into the iris model.

7. The method of claim 1, wherein sampling the plurality of patches using the iris control map includes:
determining a plurality of saliency values for a plurality of patches of the iris control map, wherein the plurality of saliency values define an order in which the plurality of patches from the plurality of eyes are synthesized into the iris model; and
sampling the one or more patches according to the plurality of saliency values determined for the plurality of patches.

8. The method of claim 1, further comprising:
combining high resolution frequencies of the synthesized texture with low resolution frequencies of the iris control map.

9. A system for generating a parametric eye model of one or more eyes, comprising:
a memory storing a plurality of instructions; and
one or more processors configurable to:
obtain eye data from an eye model database, the eye data including eyeball data and iris data corresponding to a plurality of eyes;
generate an eyeball model of a subject using the eyeball data from the eye model database, wherein generating the eyeball model includes iteratively establishing correspondences among the plurality of eyes and modifying the eyeball model based on the established correspondences, wherein establishing correspondences among the plurality of eyes includes:
rigidly aligning each shape of each of the plurality of eyes with the eyeball model;
fitting the eyeball model to each rigidly aligned shape of the plurality of eyes by identifying a limbus of the at least one eye in one or more input images, and minimizing a distance between a limbus of the eyeball model and the identified limbus of the at least one eye;
generating non-rigidly deformed eyeball models by non-rigidly deforming the fitted eyeball model to each shape of each eye of the plurality of eyes; and
updating the eyeball model using the non-rigidly deformed eyeball models;
generate an iris model of the subject using the iris data from the eye model database and an iris control map, the iris control map including a low-resolution representation of an iris of the subject, wherein generating the iris model includes sampling a plurality of patches from the plurality of eyes and merging the plurality of patches into a high-resolution synthesized texture, and wherein sampling of patches from the plurality of eyes is constrained by the iris control map; and
generate the parametric eye model of the subject, the parametric eye model including the eyeball model and the iris model.

10. The system of claim 9, wherein the one or more processors configurable to:
generate a vein model including a vein network, wherein veins in the vein network are grown from seed points in directions and by amounts controlled by one or more vein recipes, and wherein the parametric eye model includes the vein model.

11. The system of claim 9, wherein the eyeball model includes a principal component analysis (PCA) model built from the plurality of eyes in correspondence, the eyeball model including a mean shape of the plurality of eyes and a plurality of principal modes of variation, the plurality of principal modes of variation corresponding to variation among shapes of the plurality of the eyes.

12. The system of claim 11, wherein iteratively establishing the correspondences among the plurality of eyes and modifying the eyeball model based on the established correspondences includes:
rigidly aligning each shape of each eye of the plurality of eyes with the eyeball model;
fitting the eyeball model to each rigidly aligned shape of each eye of the plurality of eyes;
generating non-rigidly deformed eyeball models by non-rigidly deforming the fitted eyeball model to each shape of each eye of the plurality of eyes; and
updating the eyeball model using the non-rigidly deformed eyeball models.

13. The system of claim 9, wherein generating the iris model further includes:
determining geometries for the iris model over a plurality of pupil dilations, wherein the geometries are indicated by vertex information of the one or more patches, wherein vertex information for a vertex of a patch includes a position of the vertex relative to one or more neighboring vertices; and
synthesizing the geometries into the iris model.

14. The system of claim 9, wherein sampling the plurality of patches using the iris control map includes:
  determining a plurality of saliency values for a plurality of patches of the iris control map, wherein the plurality of saliency values define an order in which the plurality of patches from the plurality of eyes are synthesized into the iris model; and
  sampling the one or more patches according to the plurality of saliency values determined for the plurality of patches.

15. The system of claim 9, wherein the one or more processors configurable to:
  combine high resolution frequencies of the synthesized texture with low resolution frequencies of the iris control map.

16. A non-transitory computer-readable memory storing a plurality of instructions executable by one or more processors, the plurality of instructions comprising:
  instructions that cause the one or more processors to obtain eye data from an eye model database, the eye data including eyeball data and iris data corresponding to a plurality of eyes;
  instructions that cause the one or more processors to generate an eyeball model of a subject using the eyeball data from the eye model database, wherein generating the eyeball model includes iteratively establishing correspondences among the plurality of eyes and modifying the eyeball model based on the established correspondences, wherein establishing correspondences among the plurality of eyes includes:
    rigidly aligning each shape of each of the plurality of eyes with the eyeball model;
    fitting the eyeball model to each rigidly aligned shape of the plurality of eyes by identifying a limbus of the at least one eye in one or more input images, and minimizing a distance between a limbus of the eyeball model and the identified limbus of the at least one eye;
    generating non-rigidly deformed eyeball models by non-rigidly deforming the fitted eyeball model to each shape of each eye of the plurality of eyes; and
    updating the eyeball model using the non-rigidly deformed eyeball models;
  instructions that cause the one or more processors to generate an iris model of the subject using the iris data from the eye model database and an iris control map, the iris control map including a low-resolution representation of an iris of the subject, wherein generating the iris model includes sampling a plurality of patches from the plurality of eyes and merging the plurality of patches into a high-resolution synthesized texture, and wherein sampling of patches from the plurality of eyes is constrained by the iris control map; and
  instructions that cause the one or more processors to generate the parametric eye model of the subject, the parametric eye model including the eyeball model and the iris model.

17. The non-transitory computer-readable memory of claim 16, further comprising:
  instructions that cause the one or more processors to generate a vein model including a vein network, wherein veins in the vein network are grown from seed points in directions and by amounts controlled by one or more vein recipes, and wherein the parametric eye model includes the vein model.

18. The non-transitory computer-readable memory of claim 16, wherein the eyeball model includes a principal component analysis (PCA) model built from the plurality of eyes in correspondence, the PCA model including a mean shape of the plurality of eyes and a plurality of principal modes of variation, the plurality of principal modes of variation corresponding to variation among shapes of the plurality of the eyes.

19. The non-transitory computer-readable memory of claim 18, wherein iteratively establishing the correspondences among the plurality of eyes and modifying the eyeball model based on the established correspondences includes:
  rigidly aligning each shape of each eye of the plurality of eyes with the eyeball model;
  fitting the eyeball model to each rigidly aligned shape of each eye of the plurality of eyes;
  generating non-rigidly deformed eyeball models by non-rigidly deforming the fitted eyeball model to each shape of each eye of the plurality of eyes; and
  updating the eyeball model using the non-rigidly deformed eyeball models.

20. The non-transitory computer-readable memory of claim 16, wherein generating the iris model further includes:
  determining geometries for the iris model over a plurality of pupil dilations, wherein the geometries are indicated by vertex information of the one or more patches, wherein vertex information for a vertex of a patch includes a position of the vertex relative to one or more neighboring vertices; and
  synthesizing the geometries into the iris model.

21. The non-transitory computer-readable memory of claim 16, wherein sampling the plurality of patches using the iris control map includes:
  determining a plurality of saliency values for a plurality of patches of the iris control map, wherein the plurality of saliency values define an order in which the plurality of patches from the plurality of eyes are synthesized into the iris model; and
  sampling the one or more patches according to the plurality of saliency values determined for the plurality of patches.

* * * * *